United States Patent
Boustead et al.

(10) Patent No.: US 9,961,208 B2
(45) Date of Patent: May 1, 2018

(54) SCHEMES FOR EMPHASIZING TALKERS IN A 2D OR 3D CONFERENCE SCENE

(71) Applicant: Dolby Laboratories Licensing Corporation, San Francisco, CA (US)

(72) Inventors: Paul Boustead, Figtree (AU); Gary Spittle, Hillsborough, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 558 days.

(21) Appl. No.: 14/387,301

(22) PCT Filed: Mar. 21, 2013

(86) PCT No.: PCT/US2013/033370
§ 371 (c)(1),
(2) Date: Sep. 23, 2014

(87) PCT Pub. No.: WO2013/142731
PCT Pub. Date: Sep. 26, 2013

(65) Prior Publication Data
US 2015/0052455 A1    Feb. 19, 2015

Related U.S. Application Data

(60) Provisional application No. 61/614,600, filed on Mar. 23, 2012, provisional application No. 61/656,627, filed on Jun. 7, 2012.

(51) Int. Cl.
*H04M 3/56* (2006.01)
*G06F 3/0484* (2013.01)

(52) U.S. Cl.
CPC .......... *H04M 3/568* (2013.01); *G06F 3/0484* (2013.01)

(58) Field of Classification Search
CPC ............................ G06F 3/0484; H04M 3/568
See application file for complete search history.

(56) References Cited

U.S. PATENT DOCUMENTS

| | | | |
|---|---|---|---|
| 5,404,406 A | 4/1995 | Fuchigami | |
| 5,675,374 A * | 10/1997 | Kohda | H04N 7/152 348/14.1 |

(Continued)

FOREIGN PATENT DOCUMENTS

| | | |
|---|---|---|
| WO | 01/06742 | 1/2001 |
| WO | 2005/089360 | 9/2005 |

(Continued)

OTHER PUBLICATIONS

Haun, M. et al. "3DTel-A Spatial Audio Teleconferencing System" 44th International Conference: Audio Networking AES, New York, USA, pp. 1-10, Nov. 18, 2011.

(Continued)

*Primary Examiner* — Andrea Long

(57) ABSTRACT

The present document relates to methods and systems for setting up and managing two-dimensional or three-dimensional scenes for audio conferences. A conference controller (111, 175) configured to place a plurality of upstream audio signals (123, 173) associated with a plurality of conference participants within a 2D or 3D conference scene to be rendered to a listener (211) is described. The conference controller (111, 175) is configured to set up a X-point conference scene with X different spatial talker locations (212) within the conference scene; assign the plurality of upstream audio signals (123, 173) to respective ones of the talker locations (212); determine a degree of activity of the plurality of upstream audio signals (123, 173); determine a dominant one of the plurality of upstream audio signals (123, 173); and emphasize the dominant upstream audio signal (123, 173).

21 Claims, 6 Drawing Sheets

(56) References Cited

U.S. PATENT DOCUMENTS

| | | | |
|---|---|---|---|
| 6,011,851 A | 1/2000 | Connor | |
| 6,346,963 B1* | 2/2002 | Katsumi | H04N 7/152 348/14.07 |
| 6,466,913 B1 | 10/2002 | Yasuda | |
| 6,473,114 B1* | 10/2002 | Strubbe | H04N 7/142 348/14.07 |
| 6,559,863 B1* | 5/2003 | Megiddo | H04L 12/1827 348/14.08 |
| 7,391,877 B1 | 6/2008 | Brungart | |
| 7,720,212 B1 | 5/2010 | Jouppi | |
| 7,768,543 B2* | 8/2010 | Christiansen | H04L 29/06027 348/14.08 |
| 7,984,378 B1* | 7/2011 | Atkins | G06Q 10/109 715/733 |
| 8,085,920 B1* | 12/2011 | Bedingfield, Sr. | H04M 3/568 379/202.01 |
| 2002/0196947 A1 | 12/2002 | Lapicque | |
| 2003/0044002 A1 | 3/2003 | Yeager | |
| 2003/0063573 A1* | 4/2003 | Vandermersch | H04L 12/1813 370/260 |
| 2004/0052218 A1* | 3/2004 | Knappe | H04M 3/42187 370/260 |
| 2004/0076301 A1 | 4/2004 | Algazi | |
| 2005/0018828 A1* | 1/2005 | Nierhaus | H04L 29/00 379/202.01 |
| 2005/0265535 A1* | 12/2005 | Kanada | H04M 3/568 379/202.01 |
| 2006/0205426 A1 | 9/2006 | Denton | |
| 2006/0245601 A1 | 11/2006 | Michaud | |
| 2007/0025538 A1 | 2/2007 | Jarske | |
| 2007/0156908 A1* | 7/2007 | Szomolanyi | H04L 12/1822 709/227 |
| 2007/0263076 A1* | 11/2007 | Andrews | H04N 7/148 348/14.08 |
| 2007/0263823 A1* | 11/2007 | Jalava | H04M 3/56 379/202.01 |
| 2008/0144794 A1 | 6/2008 | Gardner | |
| 2008/0160976 A1* | 7/2008 | Virolainen | H04M 3/568 455/416 |
| 2008/0181416 A1 | 7/2008 | Jung | |
| 2008/0260131 A1* | 10/2008 | Akesson | H04M 3/56 379/202.01 |
| 2009/0033737 A1* | 2/2009 | Goose | G06F 3/0481 348/14.07 |
| 2009/0046864 A1 | 2/2009 | Mahabub | |
| 2009/0116652 A1 | 5/2009 | Kirkeby | |
| 2010/0054483 A1 | 3/2010 | Mizuno | |
| 2010/0085416 A1* | 4/2010 | Hegde | H04N 7/157 348/14.08 |
| 2010/0215164 A1* | 8/2010 | Sandgren | H04M 3/56 379/202.01 |
| 2010/0316232 A1* | 12/2010 | Acero | H04R 27/00 381/92 |
| 2011/0096915 A1 | 4/2011 | Nemer | |
| 2011/0173553 A1* | 7/2011 | Karmon | G06T 11/206 715/767 |
| 2011/0299707 A1 | 12/2011 | Meyer | |
| 2012/0166534 A1* | 6/2012 | Bentley | H04L 12/1822 709/204 |

FOREIGN PATENT DOCUMENTS

| | | |
|---|---|---|
| WO | 200/143561 | 11/2008 |
| WO | 2010/040408 | 4/2010 |

OTHER PUBLICATIONS

Hyder, M. et al "Placing the Participants of a Spatial Audio Conference Call" IEEE Consumer Communications and Networking Conference, Jan. 9-12, 2010, pp. 1-7, Las Vegas, NV, USA.

Rothbucher, M. et al "Backwards Compatible 3D Audio Conference Server Using HRTF Synthesis and SIP" IEEE Seventh International Conference on Signal-Image Technology and Internet-Based Systems (SITIS), Nov. 28-Dec. 1, 2011, pp. 111-117.

* cited by examiner

SCHEMES FOR EMPHASIZING TALKERS IN A 2D OR 3D CONFERENCE SCENE

CROSS-REFERENCE TO RELATED APPLICATIONS

This application claims the benefit of priority to U.S. Provisional Patent Application No. 61/614,600 filed on 23 Mar. 2012 and U.S. Provisional Patent Application No. 61/656,627 filed 7 Jun. 2012, hereby incorporated by reference in their entireties.

TECHNICAL FIELD OF THE INVENTION

The present document relates to audio conferences. In particular, the present document relates to methods and systems for setting up and managing two-dimensional or three-dimensional scenes for audio conferences.

BACKGROUND OF THE INVENTION

One of the deficiencies in current multi-party voice conferences is that voices are typically all rendered to the listeners as a monaural audio stream—essentially overlaid on top of each other and usually presented to the listeners "within the head" when headphones are used. Spatialisation techniques, used e.g. to simulate different people talking from different rendered locations, can improve intelligibility of speech in a voice conference, in particular when there are multiple people speaking. The present document addresses the technical problem of designing appropriate two-dimensional (2D) or three-dimensional (3D) scenes for an audio conference which allow a listener to easily distinguish the different talkers of the audio conference. Furthermore, schemes for populating a 2D or 3D conference scene with participants are described, which allow to reduce the impact on an ongoing audio conference, when adding new participants into the conference scene. In addition, appropriate schemes for emphasizing dominant talkers within a conference scene are described.

According to an aspect a conference controller configured to place a plurality of upstream audio signals associated with a plurality of conference participants within 2D or 3D conference scene is described. The conference scene is to be rendered to a listener. Typically, the listener is positioned at a central position of the conference scene (e.g. at the center of a circle or a sphere, if the conference scene is modeled as a circle or a sphere). The plurality of upstream audio signals may be audio signals generated at the terminals (e.g. computing devices or telephone devices) of the corresponding plurality of conference participants. As such, the plurality of upstream audio signals typically comprises the speech signals of the plurality of conference participants. For this reason, the upstream audio signals may also be referred to as talker audio signals. The conference controller may be positioned (at a central position) within a communication network (e.g. in a so called centralized conference architecture) and/or the conference controller may be positioned at a terminal of a conference participant (e.g. in a so called distributed conference architecture). The conference controller may also be referred to as a scene manager, in the instance of using a 2D or 3D rendering system. The conference controller may be implemented using a computing device (e.g. a server).

The conference controller may be configured to set up an X-point conference scene with X different spatial talker locations within the conference scene, X being an integer, X>0 (e.g. X>1, in particular X=1, 2, 3, 4, 5, 6, 7, 8 or 10). In this context, the conference controller may be configured to calculate the X-point conference scene with X different spatial talker locations based on one or more of the conference scene design rules described in the present document. One such design rule may e.g. be that the X talker locations are positioned within a cone around a midline in front of the head of a listener. Other design rules may relate to an angular separation of the X talker locations. Alternatively or in addition, the conference controller may be configured to select the X-point conference scene with the X different spatial talker locations from a set of pre-determined conference scenes comprising pre-determined speaker locations. By way of example, the set may comprise one or more pre-determined X-point conference scenes with X different pre-determined spatial talker locations. As such, the X-point conference scene may be a pre-determined X-point conference scene with X pre-determined speaker locations.

The conference controller may be configured to set up different conference scenes (e.g. different X-point conference scenes with differently placed talker locations and/or conference scenes with different values of X). The X talker locations of the X-point conference scene may be positioned within a cone around a midline in front of the head of the listener. The midline may be an imaginary line starting at a mid point on an imaginary line between the ears of the listener and extending perpendicularly to the imaginary line between the ears of the listener in front of the head of the listener. A generatrix of the cone and the midline may form an (absolute) angle which is smaller than or equal to a pre-determined maximum cone angle. The maximum cone angle may be preferably 30°, or narrower such as 20°, or even 15°, depending on the population of the cone.

The conference controller may be configured to assign the plurality of upstream audio signal to respective ones of the X talker locations. By assigning the plurality of upstream audio signals to particular talker locations within the conference scene, the conference controller enables a rendering device (e.g. a terminal of the listener of the conference scene) to render the plurality of upstream audio signals as if the upstream audio signals emanate from the respective particular talker locations. For this purpose, the conference controller is configured to generate metadata identifying the assigned talker location and enabling an audio processing unit (at a listener's terminal) to generate a spatialized audio signal based on the plurality of upstream audio signals. When rendering the spatialized audio signal to the listener, the listener perceives the plurality of upstream audio signals as coming from the assigned talker locations. The audio processing unit may be positioned within the terminal of the listener, or in the central audio server handling the audio streams. The spatialized audio signal may e.g. be a binaural audio signal which is rendered on headphones or loudspeakers at the terminal of the listener. Alternatively or in addition, the spatialized audio signal may be a multi-channel (surround sound) signal, e.g. a 5.1 or a 7.1 multi-channel signal.

The X talker locations may be placed on a circle or a sphere with the listener being placed in a center of the circle or sphere. Alternative conference scenes may comprise talker locations which are placed on an ellipse or ellipsoid. The listener does not necessarily need to be placed in the center. By way of example, in order to simulate a meeting around a table, wherein the meeting comprises the conference participant and the listener, the listener may be placed at an edge of the geometrical shape forming the conference scene, e.g. at an edge of the circle or sphere, or the ellipse or ellipsoid. In the latter case (as well as in the case where the listener is placed in the center of an ellipse or ellipsoid), the distance between the X talker locations and the listener would be different depending on the talker location.

Two adjacent talker locations of the X talker locations may be separated by at least a minimum angular distance. The minimum angular distance may be 5° or more. The above mentioned condition may be fulfilled by all pairs of adjacent talker locations of the X talker locations. The minimum angular distance allows the listener to clearly distinguish upstream audio signals which are rendered from the different talker locations. The angular distance between adjacent talker locations of the X talker locations may differ for different talker locations. By way of example, the angular distance between adjacent talker locations of the X talker locations may increase with increasing distance of the adjacent talker locations from the midline. By doing this, the varying capability of a listener to distinguish the source of sounds coming from different angles may be taken into account.

The conference controller may be configured to determine a degree of activity of the plurality of upstream audio signals at a time instant. The degree of activity of an upstream audio signal at the time instant may be determined by determining an energy (e.g. a mean squared energy value of the samples) of the upstream audio signal at the time instant. Furthermore, the conference controller may be configured to determine a dominant one of the plurality of upstream audio signals at the time instant based on the degrees of activity of the plurality of upstream audio signals at the time instant. A dominant one of the plurality of upstream audio signals may be determined by determining an upstream audio signal having the highest degree of activity at the time instant. The dominant upstream audio signal may fulfill the criteria that a ratio of the degree of activity of the dominant upstream audio signal and the degree of activity of another upstream audio signal exceeds a pre-determined threshold. In particular, the dominant upstream audio signal may fulfill the criteria that the ratios of the degree of activity of the dominant upstream audio signal and the degrees of activity of all other upstream audio signals exceed the pre-determined threshold.

The conference controller may be configured to emphasize the dominant upstream audio signal at the time instant, thereby enabling the listener of the conference scene to focus on the dominant upstream signal (i.e. on the dominant talker within the audio conference). For this purpose, the conference controller may be configured to generate (or initiate the generation of) a set of downstream audio signals, as well as metadata. The set of downstream audio signals may comprise the dominant upstream audio signal, as well as some or all of the other upstream audio signals. The metadata may identify the talker locations of the plurality of upstream audio signals. The set of downstream audio signals and the metadata may enable the audio processing unit at the listener's terminal to generate a spatialized audio signal, such that when rendering the spatialized audio signal to the listener, the listener perceives the dominant upstream audio signal in an emphasized manner.

The conference controller may be configured to assign the dominant upstream audio signal to a first of the X talker locations. In this case, the dominant upstream audio signal may be emphasized at the time instant by re-assigning the dominant upstream audio signal to a center location within the 2D or 3D conference scene. The center location may be closer to the midline in front of the head of the listener than the first talker location. In other words, the conference controller may be configured to emphasize the dominant upstream audio signal by moving the spatial location of the dominant upstream audio signal to the center of the conference scene. The center location may lie between the two talker locations closest to the midline. Alternatively, the center location may correspond to the talker location closest to the midline. In this case, the conference controller may be configured to re-assign an upstream audio signal already assigned to the talker location closest to the midline to another talker location within the conference scene.

The conference controller may be configured to emphasize the dominant upstream audio signal at the time instant by increasing a rendering volume of the dominant upstream audio signal at the time instant. Alternatively or in addition, the conference controller may be configured to emphasize the dominant upstream audio signal at the time instant by moving the first talker location (i.e. the talker location assigned to the dominant upstream audio signal) closer to the listener. This may be achieved by modifying the reverberation parameters, in particular the ratio of the direct and reverberant components of the processed signal, of the conference scene for the dominant upstream audio signal.

The conference controller may be configured to emphasize the dominant upstream audio signal at the time instant by rotating the 2D or 3D conference scene around the head of the listener. Rotating the conference scene typically comprises rotating the talker locations to yield updated talker locations. Subsequent to rotating the conference scene, the upstream audio signals may be placed at one or more respective updated talker locations. The conference controller may be configured to rotate the conference scene such that the updated talker location of the dominant upstream signal is the updated talker location closest to a midline in front of the head of the listener. By rotating the conference scene in such a manner, the rotation of the head of the listener towards the dominant talker is simulated.

The conference controller may be configured to emphasize the dominant upstream audio signal at the time instant by modifying a height of the first talker location relative to the others of the X spatial talker locations. In particular, the conference controller may be configured to increase the height of the first talker location relative to the others of the X spatial talker locations. As outlined in the present document, the X talker locations may be defined using respective azimuth angles and inclination angles. As such, the conference controller may be configured to modify (e.g. increase) an inclination angle of the first talker location relative to the inclination angles of the others of the X spatial talker locations.

The conference controller may be configured to rotate the conference scene such that all updated talker locations are positioned within the above mentioned cone around the midline. Therefore, the amount of rotation within the scene will be different for each of the upstream audio signals. For this purpose, the conference controller may be configured to reduce an angular distance between adjacent talker locations, in order to determine the updated talker locations.

Typically, the conference controller is configured to repeat the determination of a dominant upstream audio signal for a plurality of succeeding time instants. At each time instant the dominant upstream audio signal may be determined. If the dominant upstream audio signal remains unchanged, the emphasis of the current dominant upstream audio signal may be maintained. On the other hand, if a new dominant upstream audio signal is determined, the former dominant upstream audio signal may be de-emphasized (by removing or reversing any of the above mentioned emphasizing schemes) and the new dominant upstream audio signal may be emphasized (according to any of the above mentioned emphasizing schemes). As such, the conference controller may be configured to determine a different new dominant one of the plurality of upstream audio signals at a second time instant after the time instant. In such a situation, the former dominant upstream audio signal may be de-emphasized at the second time instant, and the new dominant upstream audio signal may be emphasized at the second time instant.

The conference controller may be configured to classify the X spatial talker locations into a plurality of clusters, wherein a first of the plurality of clusters comprises at least two spatial talker locations. The spatial talker locations comprised within the first cluster may be directly adjacent. The clustering of spatial talker locations may be used to group the plurality of upstream audio signals according to clusters (e.g. according to departments or functions of a company). The conference controller may be configured to classify the X spatial talker locations into a plurality of clusters dependent upon classification metadata. The classification metadata may comprise an identifier associated with an electronic means of communication of a conference participant. The identifier may comprise an electronic mail address of a conference participant. The classification metadata may comprise an identifier associated with a physical location of a conference participant. The identifier may be encoded using dual-tone multi-frequency (DTMF) signaling. One or more of the plurality of upstream audio signals may comprise the classification metadata. The conference controller may be configured to extract the classification metadata from one or more of the plurality of upstream audio signals. The conference controller may be configured to facilitate input of the classification metadata by a conference participant.

According to another aspect, an audio conferencing system is described. The audio conferencing system comprises a plurality of talker terminals configured to generate a plurality of upstream audio signals associated with a plurality of conference participants, respectively (e.g. using microphones at the talker terminals). Furthermore, the audio conferencing system comprises a conference controller according to any of the aspects described in the present document. The conference controller is configured to assign the plurality of upstream audio signals to respective talker locations within a 2D or 3D conference scene, and to determine and to emphasize a dominant one of the plurality of upstream audio signals. In addition, the audio conferencing system comprises a listener terminal configured to render the dominant upstream audio signal to a listener, such that the listener perceives the dominant upstream audio signal in an emphasized manner.

According to a further aspect, a method for placing a plurality of upstream audio signals associated with a plurality of conference participants within a 2D or 3D conference scene to be rendered to a listener is described. The method comprises setting up a X-point conference scene with X different spatial talker locations within the conference scene, X being an integer, X>0. Furthermore, the method comprises assigning the plurality of upstream audio signals to respective (different) ones of the talker locations. The method proceeds in determining a degree of activity of the plurality of upstream audio signals at a time instant, and in determining a dominant one of the plurality of upstream audio signals at the time instant based on the degrees of activity of the plurality of upstream audio signals at the time instant. Furthermore, the method comprises emphasizing the dominant upstream audio signal at the time instant.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

BRIEF DESCRIPTION OF THE DRAWINGS

The invention is explained below in an exemplary manner with reference to the accompanying drawings, wherein.

DESCRIPTION OF EMBODIMENTS OF THE INVENTION

As outlined in the introductory section, current multi-party audio conference systems typically overlay the audio signals of a plurality of parties participating in an audio conference into a monaural audio signal which is provided as a single audio stream to each of the participating parties. This makes it difficult for a participating party (when listening) to distinguish the other participating parties from one another (when the other parties are talking). In the present document, multi-party audio conference systems are described which allow for the spatialisation of the plurality of parties of an audio conference, i.e. which allow to place different participating parties of the audio conference at different spatial locations within a two-dimensional (2D) or three-dimensional (3D) audio scene. As a result, a listening party perceives the other participating parties as talking from different respective spatial locations, thereby enabling the listening party to better distinguish the other participating parties.

Figure 1A:
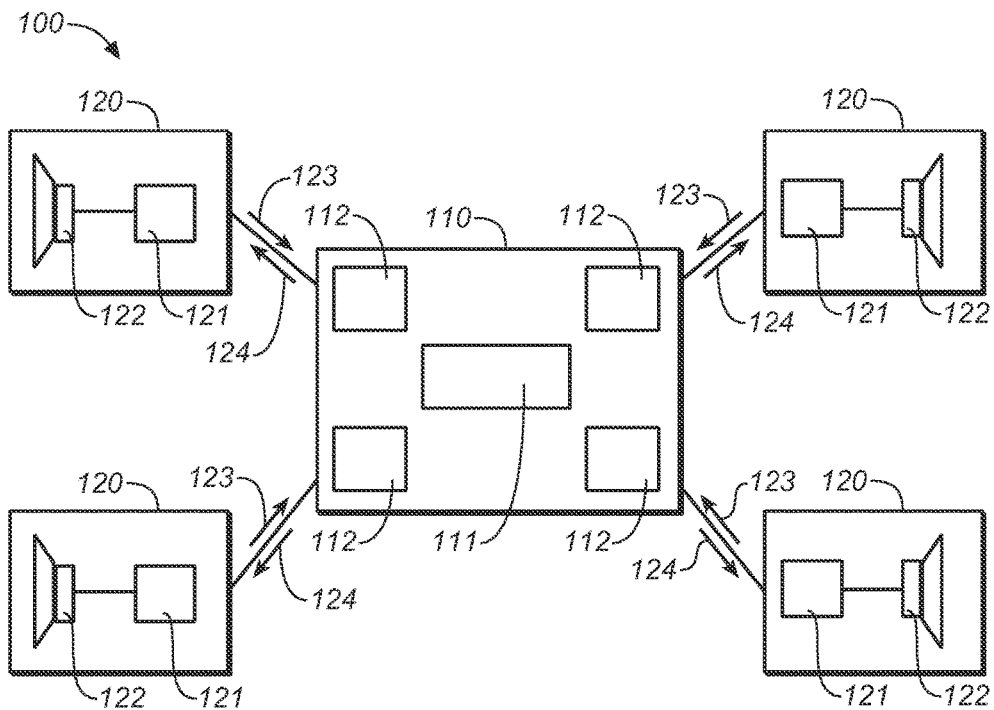
FIG. 1a shows a block diagram of an example centralized audio conference system.

FIG. 1a illustrates an example multi-party audio conference system 100 with a centralized architecture. A centralized conference server 110 receives a plurality of upstream audio signals 123 from a respective plurality of terminals 120. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG 4 audio bitstream. Typically, the upstream audio signal 123 is a mono audio signal. Hence, the centralized conference server 110 (e.g. the audio servers 112 comprised within the conference server 110) may be configured to decode the upstream audio streams (representing the upstream audio signals 123) and to extract optional metadata associated with upstream audio streams.

The conference server 110 may e.g. be an application server of an audio conference service provider within a telecommunication network. The terminals 120 may e.g. be computing devices, such as laptop computers, desktop computers, tablet computers, and/or smartphones; as well as telephones, such as mobile telephones, cordless telephones, desktop handsets, etc. . . . . The conference server 110 comprises a central conference controller 111 configured to combine the plurality of upstream audio signals 123 to from an audio conference. The central conference controller 111 may be configured to place the plurality of upstream audio signals 123 at particular locations within a 2D or 3D conference scene and generate information regarding the arrangement (i.e. the locations) of the plurality of upstream audio signals 123 within the conference scene.

Furthermore, the conference server 110 comprises a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), as well as the information regarding the arrangement of the plurality of upstream audio signals 123 within the conference scene. The information regarding the arrangement of the plurality of upstream audio signals 123 within the conference scene is typically provided by the conference controller 111 which thereby informs the audio server 112 (or processing module/thread) on how to process the audio signals. Using this information, the audio server 112 generates a set of downstream audio signals 124, as well as corresponding metadata, which is transmitted to the respective terminal 120, in order to enable the respective terminal 120 to render the audio signals of the participating parties in accordance to the conference scene established within the conference controller 111. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG 4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120. It should be noted that the metadata may be sent to the terminal 120 as a separate stream, e.g. with a timestamp for synchronization with the downstream audio stream. This means that a terminal 120 that does not require the metadata, or that does not know how to decode the metadata can still process the basic downstream audio streams (and render the audio signals to the listener at the terminal 120). In other words, the set of downstream audio signals 124 and the metadata may be encoded in a downward compatible way, such that terminals 120 which are not enabled for the rendering of 2D or 3D conference scenes may still be used to render the downstream audio signals (e.g. in a mixed form).

As such, the audio servers 112 may be configured to perform the actual signal processing (e.g. using a digital signal processor) of the plurality of upstream audio streams and/or the plurality of upstream audio signals, in order to generate the plurality of downstream audio streams and/or the plurality of downstream audio signals, as well as the metadata describing the conference scene. The audio servers 112 may be dedicated to a corresponding terminal 120 (as illustrated in FIG. 1a). Alternatively, an audio server 112 may be configured to perform the signal processing for a plurality of terminals 120, e.g. for all terminals 120.

It should be noted that the upstream audio signal 123 of a terminal 120 may also be referred to as a talker audio signal 123, because it comprises the audio signal which is generated by the conference participant that is talking at the terminal 120, e.g. talking into a microphone of the terminal 120. In a similar manner, the set of downstream audio signals 124 which is sent to the terminal 120 may be referred to as a set of auditor audio signals 124, because the set 124 comprises the plurality of audio signals which the participant at the terminal 120 listens to, e.g. using headphones or loudspeakers.

The set of downstream audio signals 124 for a particular terminal 120 is generated from the plurality of upstream audio signals 123 using the central conference controller 111 and the audio server 112, e.g. the audio server 112 (or the processing module or the software thread) for the particular terminal 120. The central conference controller 111 and the audio server 112 generate an image of the 2D or 3D conference scene as it is to be perceived by the conference participant at the particular terminal 120. If there are M participants of the audio conference, i.e. if there are M terminals 120 connected to the conference server 110, then the conference server 110 may be configured to arrange M groups of (M−1) upstream audio signals 123 within M 2D or 3D conference scenes (M being an integer with M>2, e.g. M>3, 4, 5, 6, 7, 8, 9, 10). More precisely, the conference server 110 may be configured to generate M conference scenes for the M terminals 120, wherein for each terminal 120 the remaining (M−1) other upstream audio signals 123 are arranged within a 2D or 3D conference scene.

By way of example, the conference server 110 may make use of a master conference scene which describes the arrangement of the M conference participants within a 2D or 3D spatial arrangement. The conference server 110 may be configured to generate a different perspective of the master conference scene for the M conference participants (i.e. for the M terminals 120 of the M conference participants, respectively). By doing this, it can be ensured that all of the conference participants have the same relative view of where the other conference participants are being placed. This is notably the case, if the M conference participants are positioned "around a table" (e.g. a circle) within the master conference scene, and if the listeners in the M "individual" conference scenes are positioned at an edge of the "table" (e.g. on the circle).

In another example, the conference server 110 may assign the talker locations of the conference scene in accordance to a sequential arrival of the conference participants to the conference scene. The talker locations may be assigned from an inner-most talker location to an outer-most talker location as described in the present document. As a result of such sequential order, the conference participants may be placed at the same talker locations within the conference scenes destined for different listeners. The conference server may make use of this similarity (or identity) of conference scenes in order to save computational complexity.

In a further example, the conference server 110 may make use of a single conference scene for all the M conference participants and place all of the M conference participants at pre-determined talker locations within the single conference scene. In such a case, all the M conference participants would perceive the same 2D or 3D conference scene. When providing the single conference scene to a particular terminal 120 (for a particular conference participant being the listener), the talker location of the particular conference participant may be left empty. This example may be efficient to implement as it only requires the management of a single conference scene by the conference server 110.

The M conference scenes typically differ in that a different individual of the M participants is placed within a center of the conference scene. By way of example, the conference scene for a first terminal 120 typically assumes the first terminal 120 to be in the center of the conference scene and the other (M−1) terminals to be placed around the first terminal 120. As such, the audio server 112 for the first terminal 120 generates a set of up to (M−1) downstream audio signals 124 (and corresponding metadata) from the (M−1) upstream audio signals 123 other than the upstream audio signal 123 from the first terminal 120. This terminal specific set of downstream audio signals 124 describes the conference scene for the first terminal 120, wherein the first terminal 120 is typically placed in the center location of the conference scene. In a similar manner, a set of downstream audio signals 124 is generated for the other terminals 120.

In an embodiment, the central conference controller 111 is in charge of the control of the audio conference, wherein the audio servers 112 manipulate the upstream audio signals 123 and generate the sets of downstream audio signals 124 for their corresponding terminals 120, subject to the control of the central conference controller 111. By way of example, the central conference controller 111 may not process the bearer information (i.e. the actual audio data within the upstream audio signals 123), but may process the signaling information (e.g. addressing information of the called party and the calling party, capabilities of the terminals 120, etc.). The central conference controller 111 may use the signaling information to set up an audio conference. The actual mixing of the upstream audio signals 123, the generation of a set of downstream audio signals 124, the generation of appropriate metadata which defines a terminal specific conference scene, as well as the decoding/encoding of the audio signals from/into audio bitstreams may be performed by the audio servers 112, e.g. using digital signal processors.

A terminal 120 receives its terminal specific set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and the corresponding metadata. Furthermore, the audio processing unit 121 may be configured to generate a mixed binaural audio signal for rendering by the audio transceiver 122, wherein the mixed binaural audio signal reflects the terminal specific conference scene designed at the conference server 110 for this terminal 120. In other words, the audio processing unit 121 may be configured to analyze the received metadata and to place the received set of downstream audio signals 124 into the terminal specific conference scene. As a result, the conference participant perceives a binaural audio signal which gives the conference participant at the terminal 120 the impression that the other participants are placed at specific locations within a conference scene.

The generation of a binaural audio signal for each one of the downstream audio signals 124 may be performed by processing the (mono) downstream audio signal through a spatialisation algorithm. Such an algorithm could be the filtering of the samples of the downstream audio signal using a pair of head related transfer functions (HRTFs), in order to provide a left and right ear signal. The HRTFs describe the filtering that would have naturally occurred between a sound source (of the downstream audio signal) positioned at a particular location in space and the ears of the listener. The HRTFs include all the cues for the binaural rendering of the sound, such as interaural time difference, interaural level difference and spectral cues. The HRTFs depend on the location of the sound source (i.e. on the talker location of the downstream audio signal). A different, specific pair of HRTFs may be used for each specific location within the conference scene. Alternatively, the filtering characteristics for a particular location can be created by interpolation between adjacent locations that HRTFs are available for. Hence, the terminal 120 may be configured to identify the talker location of a downstream audio signal from the associated metadata. Furthermore, the terminal 120 may be configured to determine an appropriate pair of HRTFs for the identified talker location. In addition, the terminal 120 may be configured to apply the pair of HRTFs to the downstream audio signal, thereby yielding a binaural audio signal which is perceived as coming from the identified talker location. If the terminal 120 receives more than one downstream audio signal within the set of downstream audio signals 123, the above processing may be performed for each of the downstream audio signals and the resulting binaural signals may be overlaid, to yield a combined binaural signal.

It should be noted that alternatively or in addition to the generation of a mixed binaural audio signal, the terminal 120 (e.g. the audio processing unit 121) may be configured to generate a surround sound (e.g. a 5.1 or a 7.1 surround sound) signal, which may be rendered at the terminal 120 using appropriately placed loudspeakers 122. Furthermore, the terminal 120 may be configured to generate a mixed audio signal from the set of downstream audio signals 124 for rendering using a mono loudspeaker 122.

In contrast to conventional monaural audio conference systems, where a single mixed audio signal is transmitted from the conference server to a terminal, in the audio conference system 100 of FIG. 1a a set of up to (M−1) downstream audio signals 124 and corresponding metadata are transmitted (e.g. as bitstreams) from the conference server 110 to each terminal 120. In view of bandwidth limitations of an underlying communications network, it may be beneficial to limit the number of audio signals (e.g. bitstreams) which are transmitted within a set of downstream audio signals 124. In the following, it is assumed that N is the number of downstream audio signals 124 comprised within a set of downstream audio signals 124 for a particular terminal 120, with N being an integer, e.g. N<M. It should be noted that N may be dependent on the terminal 120 and/or on the communication network between the terminal 120 and the conference server 110, i.e. N may be different for different terminals 120. By way of example, the terminal 120 may be a mobile telephone connected to the conference server 110 via a wireless network. In such cases, it may be beneficial to select a relative small number of downstream audio signals for transmission to the mobile telephone, e.g. N=1, or to change the parameters of a codec used for generating the downstream audio streams.

As outlined above, the conference server 110 receives up to M upstream audio signals 123 which are placed within a 2D or 3D conference scene. The conference server 110 may determine and analyze a degree of talker activity of the M upstream audio signals 123 at a plurality of succeeding time instants (and/or at a plurality of succeeding frames). The degree of talker activity of an upstream audio signal may be based on the energy (e.g. means square energy) of the upstream audio signal. A conference participant (and the corresponding upstream audio signal) may be classified as an "active" talker (at a particular time instant) or as an "inactive" talker (at the particular time instant), based on the degree of talker activity. This classification may change from time instant to time instant. The conference server 110 may then determine a set of downstream audio signals 124 (and associated metadata) for a particular conference participant (i.e. for a particular terminal 120) by taking into account the degree of talker activity. The selection of the upstream audio signals 123 which are inserted into the set of downstream audio signals 124 may change from time instant to time instant (as a function of the degrees of talker activity). By way of example, the conference server 110 may be configured to only consider the upstream audio signals 123 of "active" talkers at a particular time instant for the set of downstream audio signals 124.

As a result of taking into account a degree of talker activity, the conference server 110 may be configured to reduce the required bandwidth for transmitting the sets of downstream audio signals 124 to the different terminals 120. In case of a single active talker, the set of downstream audio signals 124 might only comprise a single audio signal (i.e. the upstream audio signal of the active talker), thereby significantly reducing the bandwidth on the communication link between the conference server 110 and the terminal 120. The set of downstream audio signals 124 may nonetheless comprise (or be associated with) metadata indicating the spatial location of the active talker(s). Hence, the terminal 120 may nonetheless be enabled to render the audio signals of the active talkers in a spatialized manner. The metadata may change from time instant to time instant, along with the change of talker activity. Hence, the metadata may indicate at each time instant, the spatial arrangement of the active talker(s) reflected within the set of downstream audio signals 124.

As a further measure to reduce bandwidth, discontinuous transmission may be used from the source devices (i.e. from a terminal 120) to the conference server 110. By way of example, the terminal 120 may be configured to determine the degree of talker activity based on the audio signal recorded at the terminal 120. If the degree of talker activity is low (e.g. below a pre-determined energy threshold), the terminal 120 may be configured to discontinue the transmission of the upstream audio signal 123 from the terminal 120 to the server 110, thereby reducing the required bandwidth. Hence, talkers may be assigned to the same spatial locations within the conference scene, but will only cause a conflict if the talkers talk at the same time.

Figure 1B:
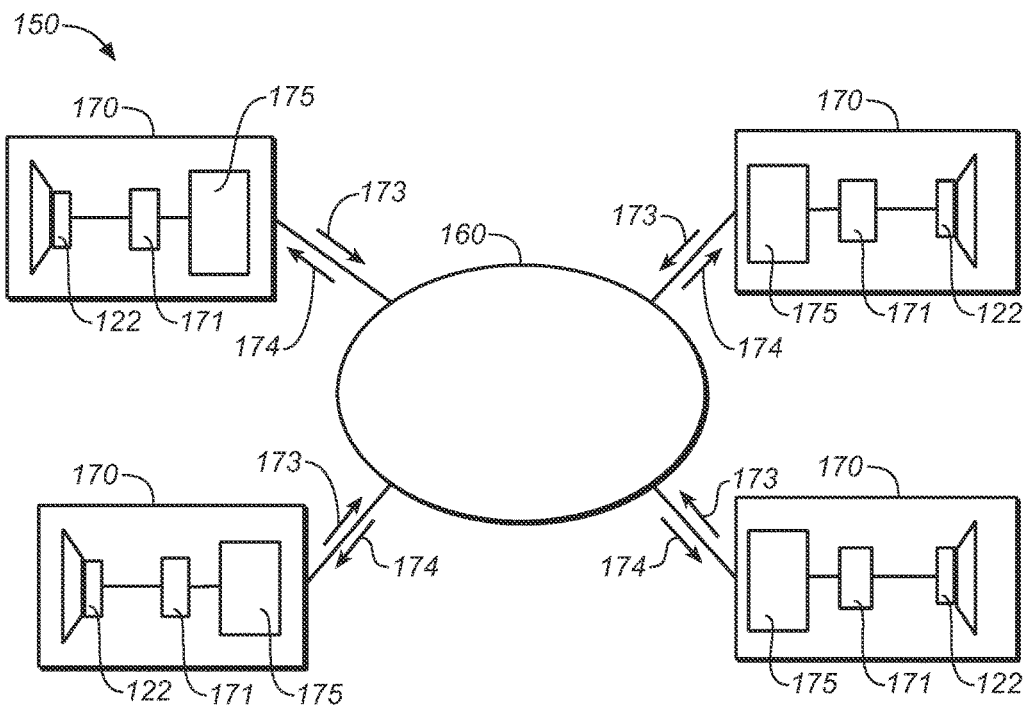
FIG. 1b shows a block diagram of an example distributed audio conference system.

FIG. 1a illustrates a 2D or 3D conference system 110 with a centralized architecture. 2D or 3D audio conferences may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

In a distributed architecture, a terminal 170 is configured to send its upstream audio signal 173 (e.g. as a bitstream) to the other participating terminals 170 via a communication network 160. For this purpose, the terminal 170 may use multicasting schemes and/or direct addressing schemes of the other participating terminals 170. Hence, in case of M participating terminals 170, each terminal 170 receives up to (M−1) downstream audio signals 174 (e.g. as bitstreams) which correspond to the upstream audio signals 173 of the (M−1) other terminals 170. The local conference controller 175 of a receiving terminal 170 is configured to place the received downstream audio signals 174 into a 2D or 3D conference scene, wherein the receiving terminal 170 is typically placed in the center of the conference scene. The audio processing unit 171 of the receiving terminal 170 is configured to generate a mixed binaural signal from the received downstream audio signals 174, wherein the mixed binaural signal reflects the 2D or 3D conference scene designed by the local conference controller 175. The mixed binaural signal is then rendered by the audio transceiver 122.

It should be noted that the centralized conference system 100 and the decentralized conference system 150 may be combined to form hybrid architectures. By way of example, the terminal 170 may also be used in conjunction with a conference server 110 (e.g. while other users may use terminals 120). In an example embodiment, the terminal 170 receives a set of downstream audio signals 124 (and corresponding metadata) from the conference server 110. The local conference controller 175 within the terminal 170 may set up the conference scene provided by the conference server 110 as a default scene. In addition, a user of the terminal 170 may be enabled to modify the default scene provided by the conference server 110.

Alternatively or in addition, the components of the conference server 110 may be distributed within a network, e.g. in order to reduce the bandwidth required by the audio conference. By way of example, the central conference controller 111 may be positioned at a first position (e.g. a central position), and the audio servers 112 may be positioned in one or more other different positions within a network. This may be beneficial, in order to select positions for the audio servers 112 which reduce the overall network capacity required for handling the audio conference. It may e.g. be beneficial to place the audio servers 112 according to the regional distribution of the participating terminals 120 of the audio conference. The communication between the audio servers 112 and the central conference controller 111 may be limited to signaling information (without the need to exchange the actual audio data).

In the following, reference will be made to the centralized conference system 100. It should be noted, however, that the disclosure is also applicable to the decentralized architecture 150 and any hybrid forms of conference systems.

Figure 2:
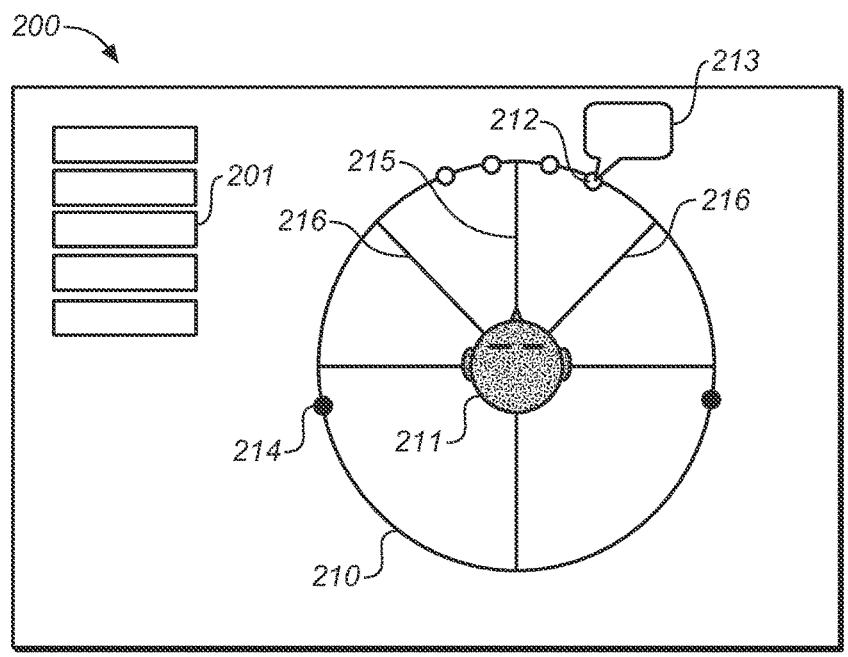
FIG. 2 shows an example Graphical User Interface (GUI) for a scene manager of an audio conference system.

FIG. 2 illustrates a Graphical User Interface (GUI) 200 of a conference scene which may be provided at the conference server 100 and/or at the terminals 120. If provided at a terminal 120, the GUI 200 may enable a participant to modify the conference scene as perceived at the terminal 120. In an embodiment, the GUI 200 enables a chairperson of an audio conference to place the conference participants within a conference scene. The GUI 200 may indicate the participants 201 of the audio conference. The participants 201 may correspond to the originators of the audio signals comprised within a set of downstream audio signals. As such, the GUI 200 may indicate up to (M−1) participants 201. Furthermore, the GUI 200 may illustrate the conference scene 210. In FIG. 2 a 2D (two-dimensional) conference scene is illustrated, e.g. as a circle. It should be noted that the GUI 200 may be adapted to illustrate a 3D (three-dimensional) conference scene, e.g. as a sphere. The listener 211 (i.e. the terminal 120 which receives the terminal specific set of downstream audio signals 124) may be placed by default in the center of the scene 210. The GUI 200 may be configured to allow for a modification of the location of the listener 211. Furthermore, the GUI 200 provides a plurality of talker locations 212 (which are illustrated as empty dots 212 in FIG. 2). The plurality of talker locations 212 may be pre-defined or may be selected by a user of the GUI 200. The talker locations 212 may be assigned to one or more of the conference participants 201. This may be done automatically (e.g. based on the metadata received along with the set of downstream audio signals 124). Alternatively or in addition, the GUI 200 may allow for a user specific assignment (e.g. using a "drag and drop" operation of the indicated participants 201 to the talker locations 212). The assignment of a participant 201 and the talker location 212 may be indicated, e.g. using a pop-up window 213. In to addition, the GUI 200 may allow to indicate and/or to modify additional sound locations 214 (which are illustrated as filled dots 214 in FIG. 2). Such sound locations 214 may be used to render sounds other than audio signals (typically voice signals) of the participants, e.g. conference notifications and/or music.

The conference system 100 may be configured to automatically determine the talker locations 212 of a conference scene 210 based on one or more of a plurality of placement rules. These placement rules are based on perceptual tests where talkers 201 were placed at different locations 212 within a conference scene 210 and where the preferred rendering locations 212 for a listener 211 were determined. These perceptual experiments have shown that A listener 211 typically prefers that talkers 201 in a conference are spatialised in front of the head of the listener 211, and preferably not behind the head of the listener 211.

More precisely, a listener 211 typically prefers that talkers 201 are placed within a cone in front of the listener's head within approximately −30° to 30° from a center line 215 in front of the listener 211, and preferably even in a narrower cone, i.e. in a cone defined by angles smaller than +/−30° from the center line 215. It has been observed that it may be uncomfortable for a listener 211 to listen to a talker 201 for a long time, if the talker is placed at large eccentricities, e.g., at angles significantly greater than 20° from the centre line 215. Hence, it may be beneficial to select the talker locations 212, such that the talker locations 212 are positioned within a cone in front of the head of a listener 211. The cone may be such that the angle between a center axis 215 of the cone and a generatrix 216 of the cone is smaller than a pre-determined maximum cone angle, e.g. 15°, 20° or 30°. The angles mentioned in the present document refer to angles with respect to the center line 215 in front of the head of the listener 211. Negative angles refer to angles in a counter clockwise direction and positive angles refer to angles in a clockwise direction from the center line 215.

The ability to separate talkers 201 from each other typically requires some angular separation, to assist talker identification and intelligibility, of approximately 5° degrees of angle or greater. Hence, it may be beneficial to select the talker locations 212, such that the angular separation between two adjacent talker locations 212 is greater than a minimum angular distance of e.g. 5°.

Completely symmetric rendering around the midline 215 (also referred to as the center line) is not preferred. The reason for this is that a symmetric rendering may sometimes result in imaging effects directly in front of the listener 211, e.g. when a conversation is occurring between two talkers 201 placed at symmetric points 212 with regards to the midline 215. Hence, it may be beneficial to arrange the talker locations 212 in an asymmetric manner with regards to the center line 215.

Asymmetric rendering has the additional advantage of providing a relatively "balanced" scene 210 when talkers 201 are added to the scene 210 due to additional participants 201 calling into the audio conference. By way of example, a default conference scene 210 comprising a maximum of six pre-defined talker locations 212 which are arranged in a symmetric manner around the midline 215 is significantly unbalanced across the midline 215, if only 1, 3, or 5 talkers 201 are placed within the scene (i.e. when the six pre-defined talker locations 212 are not yet filled with actual talkers 201).

Some or all of the above mentioned rules may be used to define default scenes 210 with default talker locations 212. Furthermore, some or all of these rules may be used to specify a deterministic behavior of an automatic scene manager (e.g. embodied by the central conference controller 111 and/or the local conference controller 175). The scene manager may be configured to automatically place participants 201 into a conference scene 210, as the participants 201 enter the conference scene 210. In other words, the scene manager (running on the central conference controller 111 and/or on the local conference controller 175) may be configured to automatically determine the talker location 212 of a new conference participant 201, based on a default conference scene 210 and based on the participants 201 which are already placed within the conference scene 210.

In the following an example three-point scene manager (populating a default three-point conference scene) and an example six-point scene manager (populating a default six-point conference scene) are described. It should be noted that using the placement rules described in the present document, general X-point scenes and corresponding X-point scene managers may be specified (with X being an integer, X=1, 2, 3, 4, 5, 6, 7, 8, 9, 10, e.g. X=M−1, for conferences having M conference participants placed at different spatial locations).

Figure 3A:
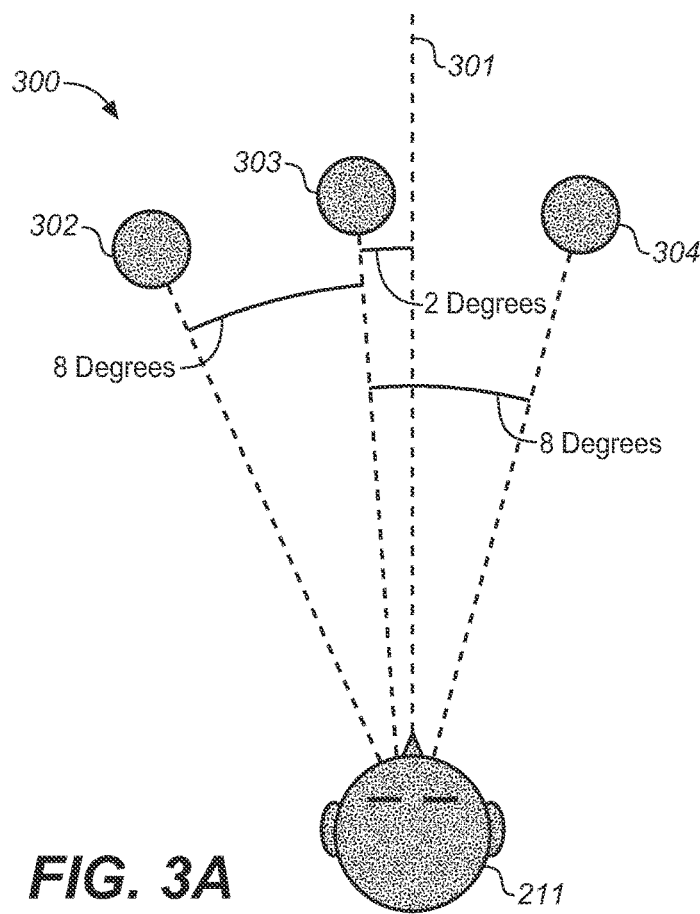
FIGS. 3a and 3b illustrate example audio conference scenes.

FIG. 3a illustrates an example three-point scene 300, where a central talker location 303 is offset by 2° from the midline 301 and where the surrounding pair of talker locations 302, 304 is offset from the central talker location 303 by +/−8°, respectively. In the illustrated example, each sound source, i.e. each talker location 302, 303, 304, has the same perceived radial distance from the listener 211.

In more general terms, a three-point scene may have the following characteristics:
- In a preferred implementation of the three-point scene, the conference participants 201 are assigned to one of three fixed talker locations 302, 303, 304. The actual talker location that a conference participant 201 is assigned to may depend on the sequential order in which the conference participants 201 are joining the audio conference.
- A central talker location 303 (the central point of the scene) is placed at a central angle from −5° to 5° around the midline 301 of the scene 300. The preferred implementation is not at a central angle of 0°, but at a central angle from 1° to 5° or from −1° to −5°. As a result of positioning the central talker location 303 off the midline 301, the overall conference scene may be asymmetric with regards to the midline 301.
- The other two points of the scene (i.e. the other talker locations 302, 303) can be placed within a cone in front of the person anywhere between −30° to 30°. The preferred implementation of the other talker locations 302, 303 is within a cone between −15° to 15°.
- The other two talker locations 302, 303 should be placed on either side of the central talker location 303 and separated from the central point of the talker location 302, 303 by at least 5° degrees of angle.
- The preferred spacing of the talker locations should be asymmetric with regards to the midline 301. This can be achieved by placing the other talker locations 302, 304 in a symmetric manner with respect to the centre point 303 (assuming that the central point 303 is not placed at 0°).

Figure 3B:
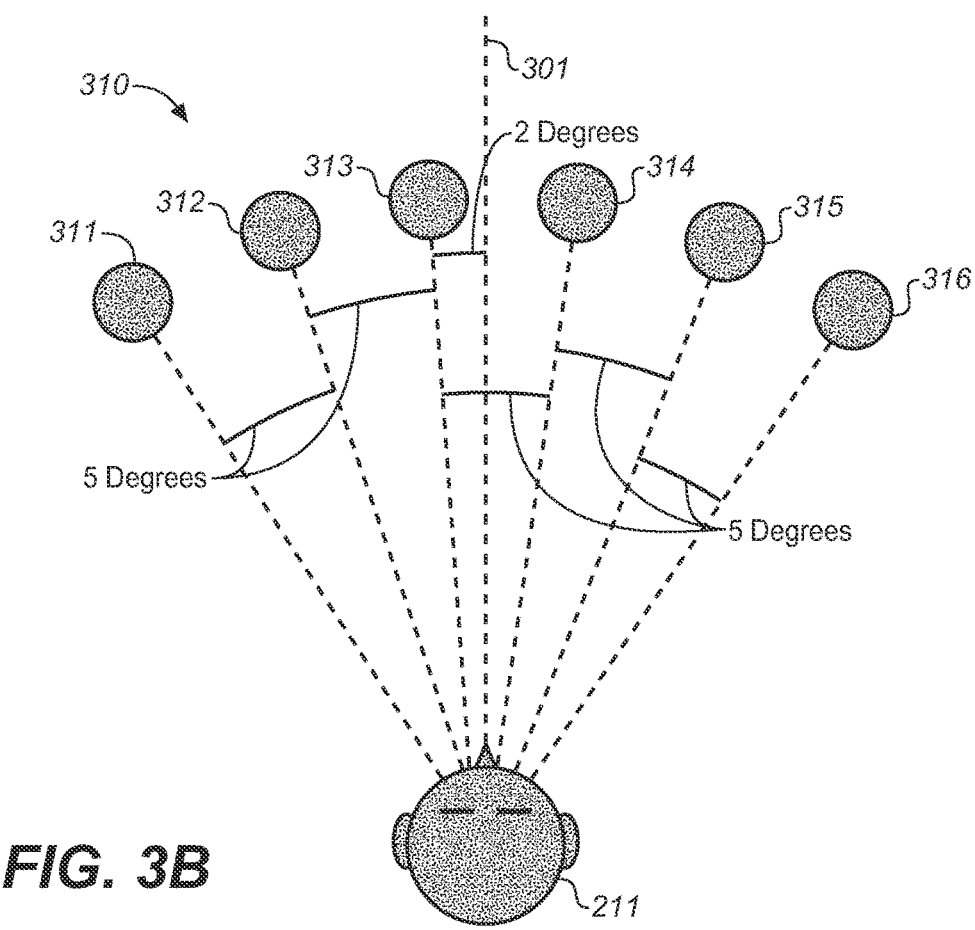

FIG. 3b shows an example six-point scene 310, where each talker 201 is separated from each other by 5° and where the entire scene 310 is rotated by a fixed angle of 2° with respect to the midline 301. In other words, the talker locations 311, 312, 313,314, 315, 316 of the six-point scene 310 are symmetric with regards to the midline rotated by an angle of 2°. Each sound source, i.e. each talker location 311, 312, 313,314, 315, 316 has the same perceived radial distance from the listener 211. The six-point scene 310 allows talkers to be allocated to six different fixed points 311, 312, 313,314, 315, and 316. It should be noted that other configurations of a six-point scene 310 may be specified using the placement rules provided in the present document.

FIGS. 3a and 3b show scenes 300, 310, where the talker locations are placed at fixed angles apart from one another and wherein the arrangement of talker locations is rotated from the midline 301 by a fixed angle. It should be noted, however, that the talker locations do not need to be placed at fixed angles from each other, as long as the minimum angle is greater than a minimum preferred angle or a minimum angular distance, e.g. 5°. Also, the radial distance between adjacent talker locations may vary to provide additional distance cues.

A scene manager (e.g. a central or local conference controller) may use a pre-determined X-point scene (e.g. the 3-point scene 300 and/or the 6-point scene 310 shown in FIGS. 3a and 3b, respectively), in order to place talkers into a conference scene, as each talker enters the conference. An X-point scene, with X=(M−1), may be used for a conference having a total number of M conference participants, such that each of the M conference participants may be assigned to a different talker location.

Typically, the actual number of talkers in an audio conference is not known when the conference starts. Hence, the scene manager may be configured to add conference participants to the pre-determined X-point scene, when the conference participants call in. In particular, the scene manager may be configured to assign a particular location within the pre-determined X-point scene to a joining participant. For this purpose, the scene manager may make use of a set of rules for adding (or removing) conference participants into the pre-determined X-point scene. Example placement rules may be
- to place a new conference participant on an available talker location, which is as close as possible to the midline 301 of the X-point scene;
- to ensure a maximum balance of the assigned talker locations with regards to the midline 301 of the X-point scene and/or with regards to a center location 303 of the X-point scene;
- to fill up empty talker locations which have been left empty by conference participants which have left the X-point scene.

The above mentioned placement rules may be used alone or in combination, in order to place a new participant into an X-point scene. As such, the new participants may be added to the conference scene from the inner points of the X-point scene outwards, and/or in such a way as to maximize the balance around the centre talker location 303 of the X-point scene or to the midline 301 of the scene. If the number of talkers (M−1) in the conference scene exceeds the number of talker locations X of the X-point scene, the scene manager may be configured to assign multiple talkers to the same talker location. For the three-point scene 300 illustrated in FIG. 3a, upstream participants could be placed by the scene manager as follows:
- Participant 1: placed at −2° (i.e. at the talker location 303),
- Participant 2: placed at 6° (i.e. at the talker location 304),
- Participant 3: placed at −10° (i.e. at the talker location 302),
- Participant 4: placed at −2° (i.e. at the talker location 303),
- Participant 5: placed at 6° (i.e. at the talker location 304),
- and so forth.

Please note that in the present document, angular values are either denoted by the symbol "°", the term "degrees" or possibly both. For the six-point scene 310, new conference participants could join the scene as follows (using FIG. 3b as a reference):
- Participant 1: placed at −2° (i.e. at the talker location 313),
- Participant 2: placed at 3° (i.e. at the talker location 314),
- Participant 3: placed at −7° (i.e. at the talker location 312),
- Participant 4: placed at 8° (i.e. at the talker location 315),
- Participant 5: placed at −12° (i.e. at the talker location 311),
- Participant 6: placed at 13° (i.e. at the talker location 316),
- Participant 7: placed at −2° (i.e. at the talker location 313),
- and so forth.

A particular six-point scene 310 which has shown to have particularly good properties with regards to the ability of a listener 211 to distinguish the different participants placed at the different talker locations 311, 312, 313,314, 315, 316 makes use of the following angles for the talker locations 311, 312, 313,314, 315, 316. This particular six-point scene satisfies the constraint of minimum separation between adjacent talker locations, stays within a +−20° cone, and is slightly asymmetric with regards to the midline 301:

talker location 314 (e.g. for the first participant) at 2° from the midline 301;

talker location 313 (e.g. for the second participant) at −5° from the midline 301;

talker location 315 (e.g. for the third participant) at 9° from the midline 301;

talker location 312 (e.g. for the fourth participant) at −12° from the midline 301;

talker location 316 (e.g. for the fifth participant) at 16° from the midline 301;

talker location 311 (e.g. for the sixth participant) at −19° from the midline 301.

The above mentioned description of default scenes has been limited to an example three and an example six point scene 300, 310. It should be noted that other numbers of points within a scene are also possible, ranging from a two-point scene manager up to an (M−1)-point scene (for a conference with M participants). The number of points within a scene is typically only limited by the design and placement rules described in the present document. Furthermore, it should be noted that the indicated values of angles are examples only. The selected angle values may vary by +/−1 degree or +/−2 degrees. As such, the angle values described in the present document should be understood as approximate indications.

It should be noted that instead of or in addition to assigning multiple talkers to the same talker location (e.g. as the number of talkers (M−1) exceeds the number X of talker locations), the scene manager may be configured to upgrade the conference scene to a conference scene having a higher number of talker locations (e.g. from a 3-point scene to a 6-point scene). By way of example, the scene manager (e.g. the conference server 110) may prompt an organizer of the audio conference (located at one of the terminals 120) whether the conference scene should be upgraded (e.g. subject to a premium fee). If accepted, the scene manager may transfer the conference participants to the upgraded conference scene. By doing this, the size of the conference scene can be flexibly adapted to the actual number of conference participants. Furthermore, conference scenes with different sizes may be provided by a conference service provider as a value added service.

It should be noted that alternatively or in addition to a horizontal distribution of talkers within a conference scene, the conference scene may be extended vertically, notably if the endpoint is capable of 3D rendering. For example, the same azimuth angular separation may be used between different talker locations, but with an elevation separation of e.g. 10 degrees. In this way, layers of talkers can be created, thereby further increasing the possibilities for spatial separation of different talkers within a conference. In more general terms, the plurality of talker locations within a conference scene may be described by an azimuth angle φ (with a horizontal plane in front of the head of the listener 211, wherein the horizontal plane comprises the midline 215) and an inclination angle θ (within a vertical plane in front of the head of the listener, wherein the vertical plane comprises the midline 215). The conference scene may comprise a plurality of rows of talker locations (each talker location within a row being described by a different azimuth angle φ and a same inclination angle θ), wherein each row is positioned at a different inclination angle θ.

In the following, various schemes for reducing the required network resources for an audio conference are outlined. As discussed above, the audio conference systems described in the present document are directed at allowing a binaural rendering (or a multi-channel rendering) of a conference scene at the terminals 120 of an audio conference. The binaural rendering should allow for the placement of a talker in the conference scene within a 2D or 3D space. This is in contrast to the mixing (i.e. adding) of two (mono) audio signals together into a single (mono) signal (which does not allow for a spatial separation of the two audio signals). The binaural rendering of the talkers in a conference scene could be implemented at various locations within the conference system. The example conference system 100 of FIG. 1*a* makes use of a centralized conference server 110 which generates metadata that specifies how a corresponding set of downstream audio signals 124 is to be combined in order to form a specific conference scene. A binaural signal which reflects the specific conference scene is determined at a respective terminal 120, thereby allowing the binaural rendering to flexibly adapt to the rendering characteristics of the audio transceiver 122 at the terminal 120 (also referred to as an endpoint). Typically, the generation of a binaural signal is based on the set of downstream audio signals 124 and is based on the placement information comprised within the metadata. Furthermore, the generation of a binaural signal may be dependent on the type of audio transceiver 122 (e.g. loudspeaker or headphone). A centralized conference server 110 may not be aware of the type of audio transceiver 122 used in a terminal 120, and it may therefore be beneficial to perform the generation of the binaural signal at the terminal 120.

By way of example, the endpoint 120 may need to dynamically adapt during an audio conference. For example, the listener 211 at the endpoint 120 may start the audio conference by using a binaural headset. At a later stage, the listener 211 may be joined in the room by a second conference participant, so they disconnect the binaural headset and use the endpoint loudspeakers and microphone so they can both participate. Consequently, the rendering of the conference scene would need to be adapted in order to switch from headphones to loudspeakers. As such, the endpoint 120 may be configured to adapt the rendering of the 2D or 3D conference scene to the audio transceiver 122 used at the endpoint 120.

Hence, it may be beneficial to transmit a set of up to (M−1) individual downstream audio signals (corresponding to the (M−1) talkers within an audio conference) and associated metadata to a terminal 120. If the conference scene is limited to X talker locations, then multiple talkers may have been assigned to the same talker locations. The audio signals of talkers which have been assigned to the same talker locations may be mixed, in order to form a downstream audio signal for the respective talker location. As such, a set of up to X downstream audio signals (corresponding to the X talker locations of an X-point conference scene) and associated metadata may be sent to the terminal 120. The terminal 120 may be configured to render the 2D or 3D X-point conference scene using the set of downstream audio signals and the associated metadata. Furthermore, the terminal 120 (e.g. the terminal 170) may be configured to modify the conference scene using a local conference controller 175 (e.g. to swap talkers and talker locations, to shift the conference scene, etc.). However, in order to enable the terminal 120 to perform a binaural or a multi-channel rendering of the X-point conference scene, a set of up to X individual downstream audio signals and associated metadata have to be transmitted to the terminal 120.

Alternatively, the binaural signal for a terminal 120 may be generated at the conference server 110. This may be beneficial with regards to the required bandwidth on the link between the conference server 110 and the terminal 120, as the transmission of a binaural signal (i.e. a stereo signal) may require less bandwidth than the transmission of the set of up to (M−1) downstream audio signals and the corresponding metadata (which are typically transmitted in the form of a bitstream e.g. a G.711, a G722.2 (AMR-WB, Adaptive Multi-Rate-Wide Band), an MPEG2 or an MPEG 4 bitstream). On the other hand, the generation of the binaural signal at the conference server 110 allows for less flexibility with regards to the audio transceiver 122 used at the destination terminal 120 and/or with regards to the manipulation of the conference scene at the destination terminal 120 (also referred to as the listener terminal 120).

When performing the generation of a binaural signal at the terminals 120 (as outlined in the context of FIGS. 1a and 1b), the number of audio signals of a set of downstream audio signals 124 may be limited to a maximum number of N simultaneous active audio signals (wherein N is smaller than the number of participants M, e.g. N<M−1 and/or wherein N is smaller than the number X of talker locations within the X-point scene, i.e. N<X). This may be due to bandwidth limitations on a link between the conference server 110 and the terminal 120. In other words, in order to limit the bandwidth between the server 110 and the endpoints 120, it may be necessary to limit the maximum number of simultaneous active streams (i.e. audio signals) being sent from the server 110 to the endpoints 120. Thus, even though conference participants 201 are placed at (M−1) discrete points 121 (e.g. M=7) within a conference scene 210, the number of streams that are simultaneously delivered to the endpoints 120 may be limited to N, e.g. N=1, 2, or 3, simultaneous active streams even when implementing a (M−1)-point scene 310. The maximum number of simultaneous active streams N may be selected, in order to limit a required bandwidth between the server 110 and the endpoints 120, while at the same time providing a perceptually pleasing rendering of the multi-party conference. For the case of N=1, only one downstream audio signal 124 (e.g. as an audio stream) is sent from the server 110 to the endpoint 120 and rendering or mixing may be performed in the server 110. In this case, the rendering at the terminal 120 may be limited to a mono output. For N=2, a maximum of two simultaneous audio signals 124 (e.g. as audio streams) may be sent from the server 110 to the endpoint 120 for rendering. For N=3, a maximum of three simultaneous audio signals 124 (e.g. as audio streams) may be sent from the server 110 to the endpoint 120. In each of the above cases, the server 110 may mix some streams when the number of simultaneous talkers (M−1) within the conference is greater than the predefined maximum N. In an embodiment for a three- or six-point scene 300, 310, the scene manager may be configured to limit the number of streams to be sent to an endpoint 120 to N=3 streams. In other words, the number of audio signals within a set of downstream audio signals may be limited to N=3.

It should be noted that the N downstream audio signals may be provided along with corresponding metadata. As such, the terminal 120 may be enabled to render the N downstream audio signals in a spatialized manner. By way of example, even if N=1, the single downstream audio signal may be transmitted along with metadata indicating where to place the single downstream audio signal in a 2D or 3D spatial conference scene. If only a single talker is active, the downstream audio signal (corresponding to the upstream audio signal of the single active talker) could be placed at the talker location of the single talker. This is different from a conventional mono rendering (with no spatialization). Only in case of multiple talkers (and N=1), the spatial disambiguation of the multiple talkers would be lost, to due to a mixing of the multiple talkers into a single downstream audio signal.

As outlined above, the conference server 110 may comprise a central conference controller 111 and a plurality of audio servers 112. The conference controller 111 may be configured to define the placement of conference participants in the conference scene. Furthermore, the conference controller 111 may be configured to determine whether the audio signals of one or more conference participants need to be mixed, which audio signals should be mixed and a priority of the mixing operations. In other words, the conference controller 111 may be configured to determine the need for mixing the audio signals of one or more conference participants. For this purpose, the number of conference participants M and the maximum number N of audio signals within a set of downstream audio signals 124 may be compared.

determine which audio signals should be mixed. In this context, the conference controller 111 may make use of one or more mixing rules. For example, it may be preferable to have talkers which are placed at greater angles within the conference scene to be mixed with a higher priority than the talkers which are rendered near the midline 301 of the conference scene. In other words, it may be beneficial to avoid the mixing of talkers which are placed in the front of a listener 211. This is due to the fact that a listener 211 typically observes movements within a conference scene more, if the movement occurs directly in front of the listener 211 compared to a movement which occurs at a greater angle. Furthermore, it may be assumed that the first people who join in a conference are likely to be the organizers of the conference. As outlined above, the scene manager may be configured to distribute the talker locations 212 within a conference scene 210 from a center location towards an outer location in accordance to the order of joining the conference. Hence, it may be assumed that the organizer of a conference is located at a center location, and it may therefore be desirable to provide the organizer of a conference with a preferential separation (i.e. with a lower risk of being mixed with other conference participants).

determine a placement for the mixed talkers. For this purpose, the conference controller 111 may apply one or more placement rules (e.g. the one or more placement rules described in the present document). In other words, the conference controller 111 may make use of a predefined strategy of where the mixed talkers are placed in the conference scene. By way of example, the conference controller 111 may comprise a plurality of predefined X-point conference scenes, with different values of X. If it is determined that the number of allowed audio signals N is smaller than the required number of audio signals (M−1), with M being the number of conference participants, then the conference controller 111 may be configured to place the mixed audio signals in accordance to a predefined N-point conference scene. In other words, the conference controller 111 may be configured to select a conference scene, wherein the number of talker locations within the conference scene may be adapted to the number N of audio signals which can be transmitted individually to a terminal 120.

Figure 4:
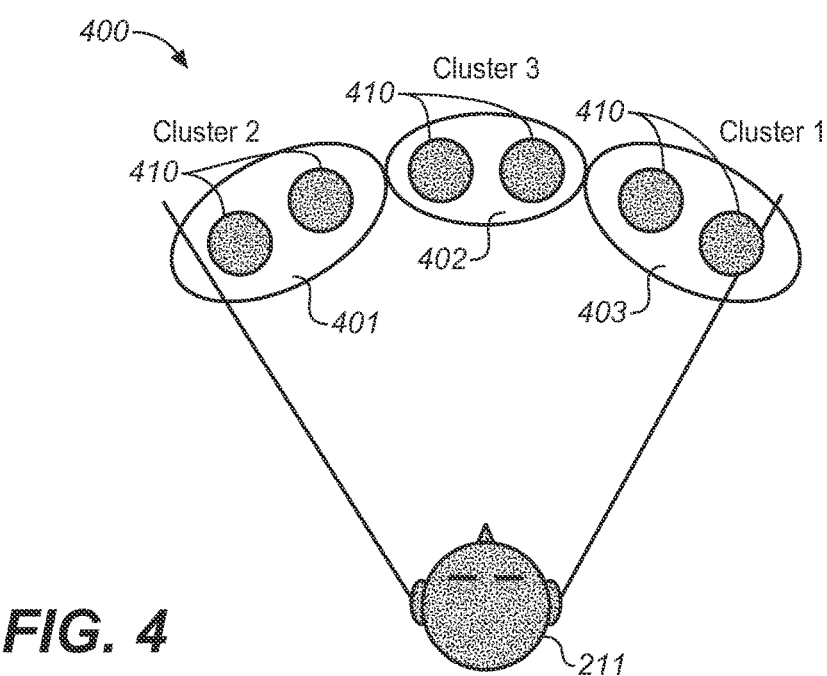
FIG. 4 illustrates example clusters of an audio conference scene.

As such, there are at least two elements to a mixing strategy used by the conference controller 111. These elements are to determine which talkers are to be mixed together and to determine where the final spatial location for the mixed talkers lays within the conference scene. By way of example, for a six-point scene, the conference controller 111 may be configured to identify adjacently placed angles (i.e. talker locations) for mixing. This allows for a reduction from a six-point scene down to a three-point scene (if N=3). This is illustrated in an example six-point conference scene 400 in FIG. 4. If there are only four people speaking in the scene 400, then the preferred mixing strategy could be to mix cluster 1 403 and/or cluster 2 401 if talkers at these locations 410 are active, in order to reduce the number of audio signals to the maximum number of N=3. Only if this is not sufficient talkers within Cluster 3 402 may be mixed at the server 110. As will be outlined in further detail below, the mixing is typically performed based on an analysis of talker activity. This means that at each of a plurality of time instants, the number of active upstream audio signals may be determined. If the number of active upstream audio signals at a particular time instant is greater than N, some or all of the active upstream audio signals may be mixed (in accordance to the mixing rules described in the present document).

In yet other words, the conference controller 111 may be configured to mix audio streams (i.e. mix audio signals) based on the number of streams which are present within the conference and based on a maximum number of allowable streams. If the number of streams exceeds N streams, then a mixing strategy is applied to limit the number of streams 124 which are transmitted to an endpoint 120. The mixing strategy may comprise the mixing rule to always mix large eccentricities first. Furthermore, the conference controller 111 may be configured to place the mixed stream at one of the two (or more) pre-defined talker locations where the mixed streams had originally been placed. Alternatively, the mixed stream may be placed somewhere between the two (or more) pre-defined talker locations. In a preferred implementation a mixed stream is placed midway between the talker locations of the streams that have been mixed. The conference controller 111 may perform the mixing of talkers that are placed near the midline 301 of a conference scene (e.g. cluster 3 402 of FIG. 4) only as a last resort (i.e. with reduced priority).

As discussed above, the mixing of the audio signals of the conference participants is typically only required, if the number of active talkers (i.e. M−1, for a conference having M participants) exceeds the maximum number N of allowed audio signals within a set of audio signals 124 and/or if the number of active talkers (M−1) exceeds the number of talker locations 212 within the X-point scene (i.e. M−1>X). By way of example, the mixing within a six-point scene is only required when there are 4 or more talkers. In this instance, the scene is "busy" and therefore small movements of sounds will be difficult to notice. In other words, as the number of participants in a conference increases, i.e. as the conference becomes "busy", spatial movements of sounds which results from the mixing of audio signals tend to be less perceivable by a listener 211.

The audio servers 112 may be configured to implement the mix of audio signals as defined by the conference controller 111. In other words, the audio server 112 may process the audio signals and perform the merging of the audio signals. In yet other words, in a packet based communication network the audio servers 112 may make decisions on a packet by packet basis of the audio signals, whether to implement a mix in order to reduce the total number of streams. By way of example, the audio servers 112 may be configured to determine the degree of activity of the M upstream audio signals at each of a plurality of succeeding time instants (wherein the time instants may e.g. coincide with the packets of an audio bitstream). The conference controller may analyze the degrees of activity and decide on a selection and/or mixing of upstream audio signals to bring down the total number of downstream audio signals to the allowed maximum of N. Furthermore, the conference controller may provide the placement information regarding the N downstream audio signals. The actual mixing and the generation of the metadata may then be performed by the audio servers 112 based on the decisions and placement information provided by the conference controller.

The above examples for limiting the number of audio streams towards a terminal 120 to a maximum number of N audio streams are based on a fixed selection of (possibly mixed) audio streams which are transmitted to the terminal 120. Typically, the number of active talkers within a conference is limited. In an ideal and highly organized audio conference, there would be only one active talker, while the other conference participants would be listening. As such, it might be sufficient in such a highly organized audio conference to only transmit a single audio stream (i.e. the audio stream of the active talker) along with metadata indicating the placement of the active talker within the conference scene. As another participant located at a different talker location becomes the active talker, the single transmitted audio stream may be changed to be the audio stream corresponding to the new active talker, along with metadata indicating the new talker location. As such, all the different talkers may be rendered at the terminal 120 at their respective talker locations, while at the same time only transmitting a single audio stream (and related metadata).

In more general terms, the conference controller 111 may be configured to dynamically select the set of N downstream audio signals 124 based on a degree of talker activity of the X (mixed or unmixed) audio signals placed within an X-point conference scene. At a particular time instant, the conference controller 111 may select the N most active ones of the X (mixed or unmixed) audio signals for transmission towards the terminal 120 (along with the relevant metadata for placing the selected audio signals within the conference scene). The selection of audio signals for transmission to the terminal 120 may be repeated for succeeding time instants (e.g. every 1 second or every 100 ms). As such, the number X of spatial locations which can be rendered at a terminal 120 may be maintained, while at the same time providing a reduced number N of audio streams which are transmitted to the terminal 120. In an embodiment, the (N−1) most active ones of the X (mixed or unmixed) audio signals are selected for transmission towards the terminal 120. As such, the (N−1) most active talkers may be rendered in a spatialized manner at the terminal 120.

Figure 5A:
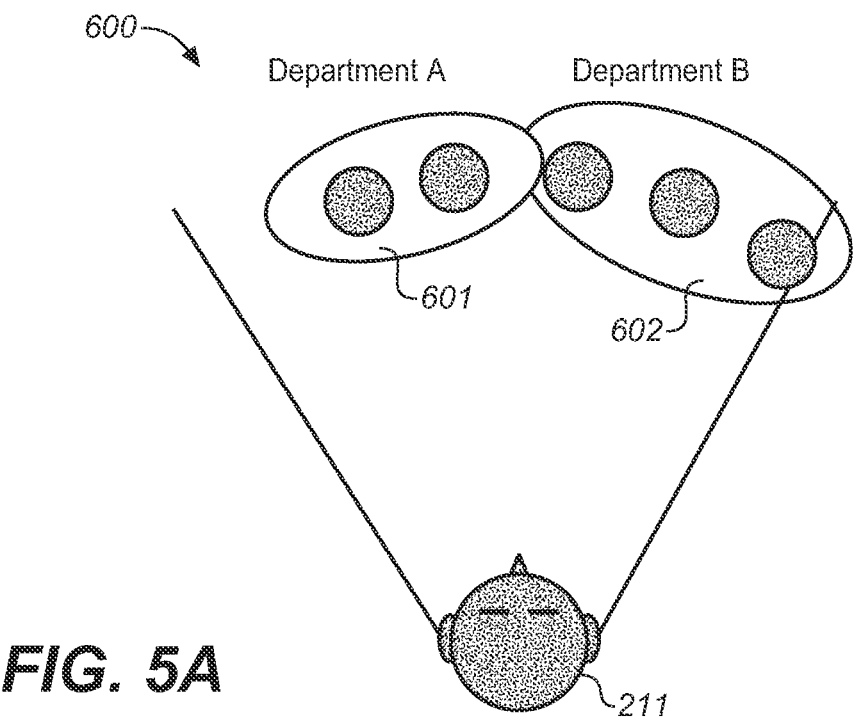
FIGS. 5a to 5b show example conference scenes with clustered talker locations.
Figure 5B:
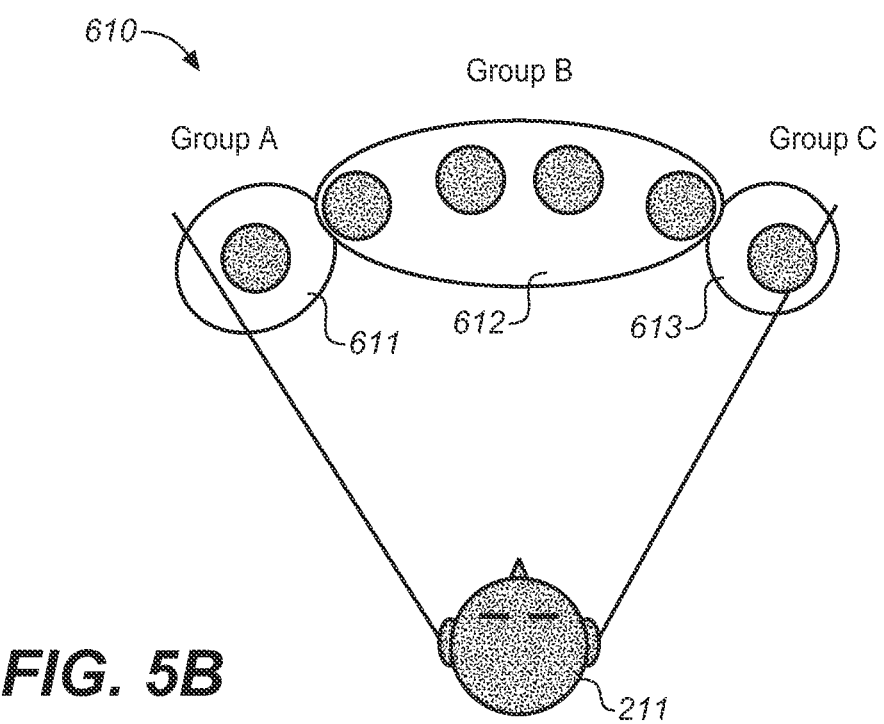

As illustrated in FIGS. 5a and 5b, the talker locations within a conference scene may be clustered. For example, participants can be grouped in clusters within the scene depending on their department, company or function. In FIG. 5a, the talker locations of the scene are clustered in a cluster 601 for department A and a cluster 602 for department B. In FIG. 5b, the talker locations are grouped into a cluster 611 for Group A, a cluster 612 for Group B, and a cluster 613 for Group C. The conference controller 111 may be configured to reserve one or more talker locations (e.g. one or more adjacent talker locations) for each of a plurality of clusters. Furthermore, the conference controller 111 may be configured to receive information regarding the affiliation of upstream audio signals 123 (i.e. of the conference participants providing the respective upstream audio signals 123) with one of the plurality of clusters. By way of example, a particular upstream audio signal 123 may be associated with metadata indicating the affiliation of the particular upstream audio signal 123. Using the information regarding the affiliation of an upstream audio signal 123, the conference controller 111 (e.g. the scene manager) may assign the upstream audio signal 123 to the one or more talker locations reserved for the cluster that the upstream audio signal 123 is affiliated with. As a result, the 2D or 3D conference scene may be used to provide acoustic information to a listener of the conference scene about the affiliation of the talkers in the conference scene to different groups.

In further detail, the conference controller 111 may in some embodiments be configured to classify the X spatial talker locations 212 into the plurality of clusters 601, 602 dependent upon classification metadata. In one case the classification metadata may comprise a plurality of identifiers, where each identifier is associated with an electronic means of communication of each conference participant. For example each identifier may comprise an electronic mail (e-mail) address of the respective conference participant. When multiple companies are invited to a conference call, the attendance information may be used to segregate the talkers into separate regions of a spatial render. This may enable listeners to more easily determine the identification of the talkers. This may be determined by the e-mail address of participants or an attendee identifier. For example, a.last_name@companyA.com, b.last_name@companyA.com, a.last_name@companyB.com and b.last_name@companyB.com may be allocated within the scene such that all attendees from company A are on one side of the auditory scene and all attendees from company B are on the other side. Alternatively this may be determined through other presence applications on a communications device such as a mobile telephone or a tablet computer.

Alternatively the classification metadata may comprise a plurality of identifiers, where each identifier is associated with a physical location of each conference participant. For example each identifier may be encoded using dual-tone multi-frequency (DTMF) signaling. Distinction between attendees may be introduced using the physical geographical location of the attendees. For example, an extension to the scenario above may be two more attendees, c.last_name@companyB.com and d.last_name@companyB.com join from a different office to employees 'a' and 'b'. Although all the company B attendees would be located on the right of the auditory scene, they may be further grouped into two regions depending on their location. An extension to the geographical grouping may be with the use of the GPS coordinates of the attendees. This may be particularly useful for participants using PSTN connections into the conference and therefore the presence and attendee identifier information may be unavailable. The system may ensure that the GPS location information is determined and fixed when used to inform the conferencing system provider. This ensures that the spatial scene is not updated if the user of a mobile device, for example, is moving between two locations whilst on a call. The GPS or location information may be encoded using DTMF signals to be passed into the conferencing system as an identifier. This may allow the encoded data to be transferred using the existing communications link, without having to create a proprietary data packing or encoding scheme.

In a further example the location of a participant using a PSTN connection to the conference may be obtained by their caller identifier when they connect to a conference.

A further grouping strategy may be determined by the Autonomous System number as provided by the IP routing of a network connection. The routing may be different for each of the groups attending the conference.

In one embodiment the plurality of upstream audio signals 123 comprises the classification metadata, and the conference controller 111 may be configured to automatically extract the classification metadata from each upstream audio signal 123. For example the conference controller 111 may be configured to automatically extract the classification metadata using voice recognition technology. An extension to this is for the participant to be asked by the IVS service, "Please state your name and company after the tone". The participant company may be determined through automatic speech recognition.

In an alternative embodiment the conference controller 111 may comprise a user interface to facilitate manual input of the classification metadata by a conference participant. When a conference call is booked, the attendees may be known. Therefore, the groupings of the attendees may be simplified by a single identifier number. For example, participants from company A may be asked to "press 1 if from company A or press 2 if from company B". Using DTMF tones, no further complexity may be necessary for the connection of the particpants.

The invention faciliates spatial rendering based on network metadata. The invention enables the creation of sensible meeting layouts using a spatial scene manager including the following scenarios: grouping of participants based on company or location; company being determined through email address, attendee list or metadata; location being determined through third party components such as GPS in the device; location being determined through caller identifier; grouping being set at conference start through attendee list; participants being asked by IVR which group they represent; participants responding using ASR for their group; connecting participants with location and company information being embedded in the data stream, either as metadata or DTMF through PSTN; automatically grouping participants depending on geography or company within an auditory scene; new participants being assigned to an existing region of the scene.

In the context of FIG. 3 it has been described how different talkers may be placed within a conference scene. In the following, different aspects for dynamically updating the conference scene are outlined. By way of example, the conference scene, i.e. notably the talker locations within the conference scene, may be updated dynamically as a function of the upstream audio signals 123 which are assigned to the talker locations. By way of example, a conference scene may be manipulated based on the detection of dominant talkers. A dominant talker may be detected e.g. based on talker activity. For this purpose, the different upstream audio signals 123 within the conference scene may be analyzed, in order to determine a dominant upstream audio signal 123 (e.g. an upstream audio signal 123 having an energy—compared to the other upstream audio signals 123—which exceeds a pre-determined dominance threshold). In an embodiment, the energy of all upstream audio signals 123 is determined and compared. If the energy of a first upstream audio signal 123 exceeds the energy of all other upstream audio signals 123 by the pre-determined dominance threshold, then the first audio signal 123 is considered to be dominant. In another embodiment, a dominant upstream audio signal 123 may be determined per cluster.

The dominant talker (i.e. the dominant upstream audio signal 123) may be respatialized to a central talker location within the conference scene. This is illustrated in the conference scene 700 of FIG. 6a, where the dominant talker is detected at a lateral position 701 and then moved to a central position 702. The other talker locations 525 may remain unchanged. The central position 702 may be located between two pre-determined talker locations 525. Furthermore, the central position 702 may be positioned off the midline 215 of the conference scene, e.g. at an angle smaller than 1°-2° degrees off the midline 215 as outlined above. Alternatively, the dominant upstream audio signal may be moved to a central location within the cluster that the dominant upstream audio signal belongs to. As such, the dominant upstream audio signals of each cluster may be determined and moved to a central position within the respective clusters.

The dominant talker may remain in the central location 702 until another talker is identified as being dominant. The new dominant talker is then moved to the central location 702 and the previous dominant talker is moved back to his/her original location 701. The movement of talkers may be implemented gradually over a pre-determined length of time, for example 2 seconds, or the movement may be implemented immediately. The gradual movement of talkers within the scene 700 can be achieved through a panning processing, e.g. by manipulating the level of the sound arriving at each ear of the listener, or by interpolating between HRTFs (Head Related Transfer Functions) for the start location 701 and for the end location 702.

Alternatively to creating a new central position 702 within the conference scene 700, the dominant talker may be reassigned to the pre-determined talker location having the lowest absolute angle with the midline 215. The talker at this centermost pre-determined talker location may be assigned to the original location of the dominant talker. As such, the dominant talker and another talker may swap their pre-determined talker locations.

Alternatively or in addition to determining a particular talker as being dominant, a talker may be tagged (by default) as being dominant. For example, if a participant in a call is the chairperson or the main presenter, this person may be tagged as being dominant. The conference controller 111 may be configured to place the default dominant talker into a centermost location, as long as no other dominant talker has been determined. If the actual dominant talker is not the chairperson, the actual dominant talker may be moved to the next most central location instead of replacing the chairperson in the most central location.

Furthermore, the conference controller 111 may be configured to determine the dominance of an upstream audio signal 123 (i.e. of a particular talker) and place the dominant upstream audio signal 123 at a central position 702 within the conference scene 700. The selection of the dominant talker can be made through a user interface to the conferencing system, e.g. through a user interface 200 as illustrated in FIG. 2.

Figure 6A:
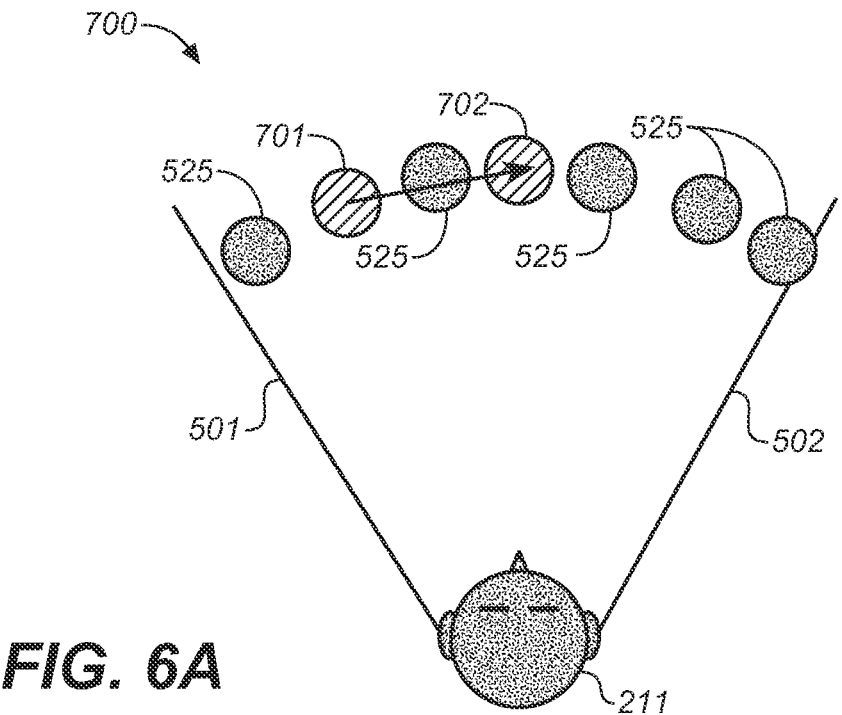
FIGS. 6a to 6d illustrate example conference scenes which are dynamically updated subject to the detection of a dominant talker.

Alternatively or in addition to moving a dominant talker (i.e. a dominant upstream audio signal 123) to the middle of a conference scene (as shown in FIG. 6a), the dominant upstream audio signal 123 can be emphasized to the listener 211 by making the sound of the upstream audio signal 123 louder, and/or by giving the impression that the dominant upstream audio signal 123 is rendered from a position closer to the listener 211 than the other upstream audio signals 123. This can be achieved by using different reverberation cues for the rendering of the dominant upstream audio signal 123, e.g. reverberation cues with an increased direct sound and a reduced reverberant sound compared to the other upstream audio signals 123. This is illustrated in the conference scene 710 of FIG. 6b, where the location 711 of the dominant talker (i.e. the dominant upstream audio signal 123) is moved forward (forward location 712) compared to the locations 525 of the other participants.

A further dimension for emphasizing a dominant talker in a 3D conference scene may be the vertical dimension. This is particularly the case if HRTFs are used for spatialisation of the audio signals. An upstream audio signal 123 may be rendered at a different elevation, for example, at a higher placement within the conference scene. In other words, the upstream audio signal 123 may be rendered at a spatial location having an inclination angle greater than zero. By way of example, the dominant upstream audio signal 123 (i.e. the dominant talker) may be rendered at a spatial talker location at a higher height than the other upstream audio signals 123 (i.e. than the other conference participants). After losing its dominance status, the former dominant talker may return to the normal vertical elevation as all the other talkers when they are not speaking or when they are not tagged as dominant. As such, the dominance of an upstream audio signal 123 may be underlined by rendering the audio signal at an increased relative height. In an embodiment, an upstream audio signal 123 (i.e. a dominant talker) which is tagged as being dominant (e.g. a conference organizer) may be constantly rendered at a vertical height above the vertical height of the other conference participants.

Figure 6B:
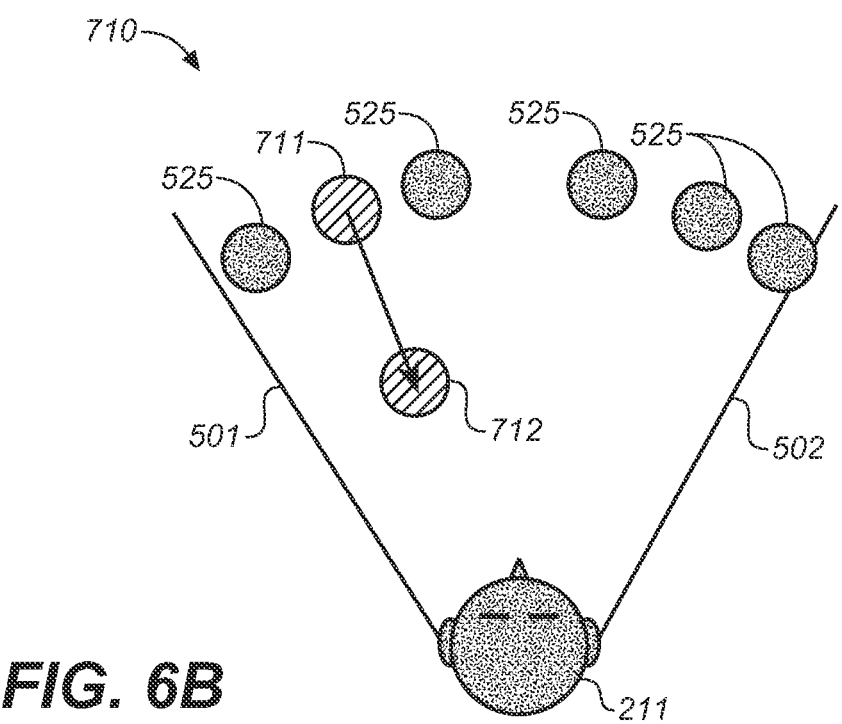
Figure 6C:
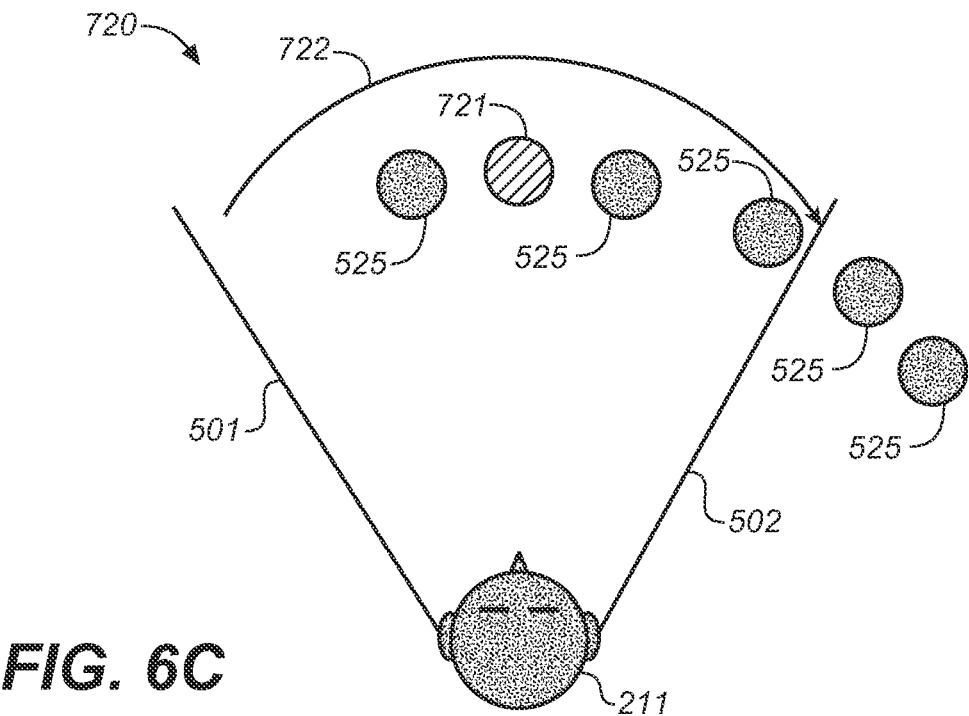

A further method for manipulation of the conference scene based on the audio signals placed within the conference scene is to rotate the entire conference scene. By way of example, the conference scene may be rotated such that a dominant upstream audio signal 123 (i.e. a dominant talker) is rendered close to the midline 215 in front of the head of the listener 211. This is analogous to a listener 211 turning his head towards the dominant talker. The conference scene 720 of FIG. 6c illustrates how a particular talker may be placed in the centre of the scene 720 by rotation 722 of the entire scene 720. FIG. 6c shows how the dominant talker 711 of FIG. 6b is moved towards the midline 215 (e.g. to 1° degree or less from the midline 215) by rotating the entire scene 710 (thereby yielding the rotated scene 720). This rotation allows the relative positions of the talkers within the scene to remain consistent (i.e. unchanged). It is similar to the listener 211 rotating their head to face the dominant talker in a real meeting scenario. This method would also allow the relative positioning of the group clusters shown in FIGS. 5a and 5b to remain consistent (i.e. unchanged).

Figure 6D:
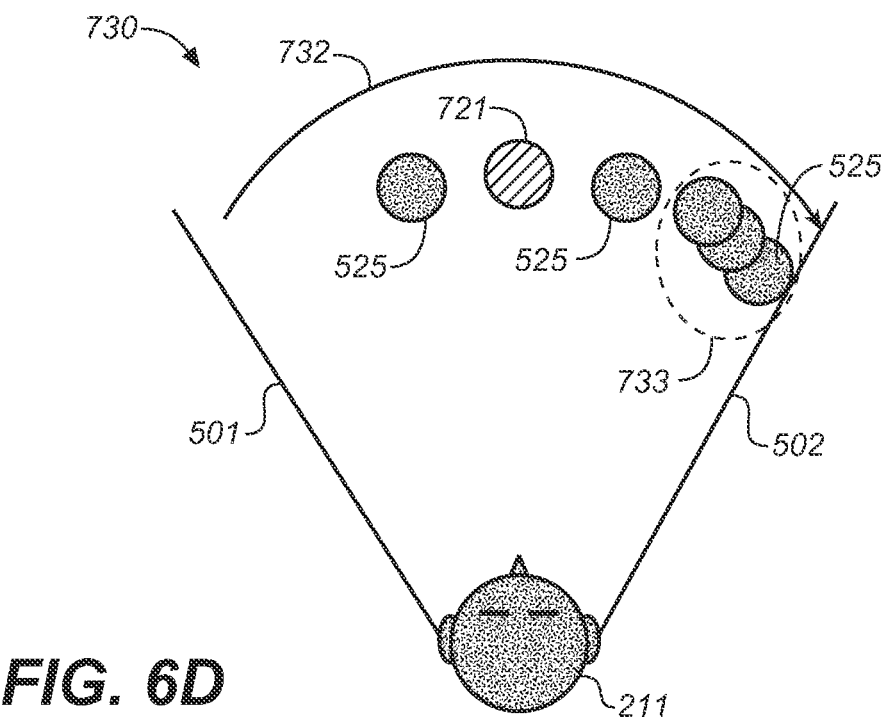

However, by rotating the scene as illustrated in FIG. 6c, some talker locations 525 may move outside the preferred cone 501, 502 of talker locations. As outlined above, this may be disturbing to the listener 211. A modification to the scene rotation is therefore to ensure that all the participants, i.e. that all talker locations, remain within the preferred cone 501, 502, while at the same time allowing the relative talker positions to remain consistent (i.e. unchanged with respect to one another). To achieve this, the participant locations may be compressed into a smaller region at the edges of the cone 501, 502. This is illustrated in the conference scene 730 of FIG. 6d. It can be seen that similar to FIG. 6c, the talker location 721 is moved towards the midline 215 by rotation 732. At the same time, the talker locations 525 in the scene area 733 which is approaching the generatrix 502 of the cone are placed closer to one another, in order to ensure that none of the talker locations 525 leaves the cone defined by the generatrix 501, 502. As such, it is ensured that all talker locations remain within the preferred cone in front of the head of the talker and that the relative arrangement of talker locations is maintained, even when rotating the scene 730.

In the present document, various aspects for managing a 2D or 3D scene of an audio conference have been described. The aspects may be provided in the context of an API (Application Programming Interface) or a GUI (Graphical User Interface), in order to allow developers of a voice conference system or users of a voice conference system to manage the placement of voice signals (originating from the different conference participants) and/or sound signals (e.g. notifications, voice prompts, music) into a conference scene. The present document provides rules and logic which may be used by a scene manager to define pre-determined X-point scenes and/or to automatically position talkers within the conference scene. Furthermore, the present document describes schemes for acoustically underlying dominant talkers within a conference scene.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A conference controller configured to place a plurality of upstream audio signals associated with a plurality of conference participants within a 2D or 3D conference scene to be rendered to a listener, wherein the conference controller is configured to
   set up an X-point conference scene with X different spatial talker locations within the conference scene, X being an integer greater than one;
   assign each audio signal of the plurality of upstream audio signals to a different one of the X different spatial talker locations;
   provide downstream audio signals and metadata to terminals corresponding to the conference participants, the metadata indicating where a terminal is to render audio signals for each of the X different spatial talker locations;
   determine a degree of activity of the plurality of upstream audio signals at a time instant;
   determine a dominant one of the plurality of upstream audio signals at the time instant based on the degrees of activity of the plurality of upstream audio signals at the time instant;
   assign the dominant upstream audio signal to a first of the X talker locations; and
emphasize the dominant upstream audio signal at the time instant by changing the metadata indicating where a terminal is to render audio signals for a relative position of the talker location for the dominant upstream audio signal relative to other talker locations such that the updated talker location at which the dominant upstream audio signal will be rendered is the updated talker location closest to a midline in front of a head of the listener, wherein the conference controller is implemented via at least one of firmware or hardware.

2. The conference controller of claim 1, wherein the metadata enables an audio processing unit of a terminal to generate a spatialized audio signal based on a set of downstream audio signals; wherein the set of downstream audio signals comprises the dominant upstream audio signal; wherein when rendering the spatialized audio signal to the listener, the listener perceives the dominant upstream audio signal in an emphasized manner.

3. The conference controller of claim 1, wherein the conference controller is configured to determine the degree of activity of an upstream audio signal at the time instant by determining an energy of the upstream audio signal at the time instant.

4. The conference controller of claim 1, wherein the conference controller is configured to determine a dominant one of the plurality of upstream audio signals by determining an upstream audio signal having the highest degree of activity at the time instant.

5. The conference controller of claim 1, wherein
   the conference controller is configured to re-assign an upstream audio signal already assigned to the talker location closest to the midline to another talker location.

6. The conference controller of claim 1, wherein the conference controller is configured to emphasize the dominant upstream audio signal at the time instant by increasing a rendering volume of the dominant upstream audio signal at the time instant.

7. The conference controller of claim 1, wherein the conference controller is configured to
   emphasize the dominant upstream audio signal at the time instant by moving the first talker location closer to the listener.

8. The conference controller of claim 1, wherein
   the X talker locations are positioned within a cone around the midline in front of the head of the listener;
   a generatrix of the cone and the midline form an angle which is smaller than or equal to a pre-determined maximum cone angle; and
   the conference controller is configured to rotate the conference scene such that all updated talker locations are positioned within the cone around the midline.

9. The conference controller of claim 1, wherein the conference controller is configured to reduce an angular distance between adjacent talker locations, in order to determine the updated talker locations.

10. The conference controller of claim 1, wherein the conference controller is configured to
    determine a different new dominant one of the plurality of upstream audio signals at a second time instant after the time instant;
    de-emphasize the former dominant upstream audio signal at the second time instant; and
    emphasize the new dominant upstream audio signal at the second time instant.

11. The conference controller of claim 1, wherein the conference controller is configured to classify the X spatial talker locations into a plurality of clusters; wherein a first of the plurality of clusters comprises at least two spatial talker locations; wherein the spatial talker locations comprised within the first cluster are directly adjacent.

12. The conference controller of claim 11, wherein the conference controller is configured to classify the X spatial talker locations into the plurality of clusters dependent upon classification metadata.

13. The conference controller of claim 12, wherein the classification metadata comprises at least one of:

an identifier associated with an electronic means of communication of a conference participant; and an identifier associated with a physical location of a conference participant.

14. The conference controller of claim 12, wherein the conference controller is configured to extract the classification metadata from one or more of the plurality of upstream audio signals.

15. The conference controller of claim 12, wherein the conference controller is configured to facilitate input of the classification metadata by a conference participant.

16. The conference controller of claim 8, wherein the conference controller is configured to calculate the X-point conference scene with X different spatial talker locations such that the X talker locations are positioned within the cone around the midline in front of the head of the listener.

17. The conference controller of claim 1, wherein the conference controller is configured to select the X-point conference scene with X different spatial talker locations from a set of pre-determined X-point conference scenes with X different pre-determined spatial talker locations.

18. The conference controller of claim 1, wherein the conference controller is configured to emphasize the dominant upstream audio signal at the time instant by modifying a height of the first talker location relative to the others of the X spatial talker locations.

19. An audio conferencing system comprising:
a plurality of talker terminals configured to generate a plurality of upstream audio signals associated with a plurality of conference participants, respectively;
a conference controller configured to:
receive the plurality of upstream audio signals;
assign each audio signal of the plurality of upstream audio signals to a different one of X different spatial talker locations within a 2D or 3D conference scene;
provide downstream audio signals and metadata to terminals corresponding to the conference participants, the metadata indicating where a terminal is to render audio signals for each of the X different spatial talker locations;
determine a dominant one of the plurality of upstream audio signals;
assign the dominant upstream audio signal to a first of the X talker locations; and
emphasize a dominant one of the plurality of upstream audio signals by changing the metadata indicating where a terminal is to render audio signals for a relative position of the talker location for the dominant upstream audio signal relative to other talker locations by re-assigning the dominant upstream audio signal to a center location within the 2D or 3D conference scene; wherein the center location corresponds to the talker location closest to a midline in front of a head of the listener; and
a listener terminal configured to render the dominant upstream audio signal to a listener according to the metadata.

20. A method for placing a plurality of upstream audio signals associated with a plurality of conference participants within a 2D or 3D conference scene to be rendered to a listener, wherein the method comprises:
setting up an X-point conference scene with X different spatial talker locations within the conference scene, X being an integer greater than one;
assigning each audio signal of the plurality of upstream audio signals to a different one of the X different spatial talker locations;
providing downstream audio signals and metadata to terminals corresponding to the conference participants, the metadata indicating where a terminal is to render audio signals for each of the X different spatial talker locations;
determining a degree of activity of the plurality of upstream audio signals, at a time instant;
determining a dominant one of the plurality of upstream audio signals at the time instant based on the degrees of activity of the plurality of upstream audio signals at the time instant;
assigning the dominant upstream audio signal to a first of the X talker locations; and
emphasizing the dominant upstream audio signal at the time instant by changing the metadata indicating where a terminal is to render audio signals for a relative position of the talker location for the dominant upstream audio signal relative to other talker locations such that the updated talker location at which the dominant upstream audio signal will be rendered is the updated talker location closest to a midline in front of a head of the listener.

21. A non-transitory storage medium comprising a software program adapted for execution on a processor and for performing the method of claim 20 when carried out on a computing device.

* * * * *